US011640615B2

(12) United States Patent
Villwock

(10) Patent No.: US 11,640,615 B2
(45) Date of Patent: May 2, 2023

(54) METHODS AND SYSTEMS FOR AUTHENTICATING GOODS AND SERVICES USING ELECTRONIC ANALYSIS OF ANALYTE ENCODED COMPOSITIONS

(71) Applicant: Thomas Villwock, San Diego, CA (US)

(72) Inventor: Thomas Villwock, San Diego, CA (US)

(*) Notice: Subject to any disclaimer, the term of this patent is extended or adjusted under 35 U.S.C. 154(b) by 507 days.

(21) Appl. No.: 16/510,533

(22) Filed: Jul. 12, 2019

(65) Prior Publication Data
US 2019/0333072 A1 Oct. 31, 2019

Related U.S. Application Data

(63) Continuation-in-part of application No. 16/331,245, filed as application No. PCT/US2017/050835 on Sep. 8, 2017, now abandoned.
(Continued)

(51) Int. Cl.
*G06Q 30/00* (2012.01)
*G01N 1/02* (2006.01)
(Continued)

(52) U.S. Cl.
CPC ....... *G06Q 30/0185* (2013.01); *B42D 25/382* (2014.10); *B42D 25/387* (2014.10); *G01N 1/02* (2013.01); *B41M 3/006* (2013.01); *B41M 3/14* (2013.01); *B41M 5/0023* (2013.01); *C09D 11/04* (2013.01); *C09D 11/14* (2013.01);
(Continued)

(58) Field of Classification Search
CPC .............. G06Q 30/0185; B42D 25/382; B42D 25/387; G01N 1/02; G01N 2001/022; G01N 2001/027; G01N 2001/028; G01N 1/405; B41M 3/006; B41M 3/14; B41M 5/0023;
(Continued)

(56) References Cited

U.S. PATENT DOCUMENTS 3,467,135 A  9/1969 Muskalla
5,026,427 A  6/1991 Mitchell et al.
(Continued)

FOREIGN PATENT DOCUMENTS

JP  2007058823 A  *  3/2007
WO  2004/003087 A1  1/2004
(Continued)

OTHER PUBLICATIONS

PCT/US2017/050835 International Search Report and Written Opinion dated Nov. 27, 2017.
(Continued)

*Primary Examiner* — Jennifer Wecker
*Assistant Examiner* — Michael Paul Shimek
(74) *Attorney, Agent, or Firm* — Wagenknecht IP Law Group PC

(57) ABSTRACT

Methods for product authentication, which include: providing an article having a substrate with an analyte encoded composition; obtaining a sample of the composition; applying the sample to a test device to obtain test results, analyzing test results from the test device using an electronic device communicatively connected to an authentication authority, wherein the electronic device transmits the test device code and the test results to the authentication authority and confirms or denies authentication after comparison to an authentication database of authentic test results.

16 Claims, 18 Drawing Sheets

Specification includes a Sequence Listing.

Related U.S. Application Data

(60) Provisional application No. 62/791,684, filed on Jan. 11, 2019, provisional application No. 62/699,466, filed on Jul. 17, 2018, provisional application No. 62/453,396, filed on Feb. 1, 2017, provisional application No. 62/393,510, filed on Sep. 12, 2016, provisional application No. 62/385,036, filed on Sep. 8, 2016.

(51) Int. Cl.

| | | |
|---|---|---|
| *B42D 25/387* | (2014.01) | |
| *B42D 25/382* | (2014.01) | |
| *B41M 3/00* | (2006.01) | |
| *B41M 3/14* | (2006.01) | |
| *C09D 11/14* | (2006.01) | |
| *C09D 11/30* | (2014.01) | |
| *C09D 11/04* | (2006.01) | |
| *B41M 5/00* | (2006.01) | |
| *G06Q 30/018* | (2023.01) | |

(52) U.S. Cl.
CPC ........ *C09D 11/30* (2013.01); *G01N 2001/022* (2013.01); *G01N 2001/027* (2013.01); *G01N 2001/028* (2013.01)

(58) Field of Classification Search
CPC ......... C09D 11/04; C09D 11/14; C09D 11/30; C09D 11/32; C09D 11/50
See application file for complete search history.

(56) References Cited

U.S. PATENT DOCUMENTS

| | | | |
|---|---|---|---|
| 5,059,984 A | 10/1991 | Moore et al. | |
| 5,347,302 A | 9/1994 | Simonoff | |
| 5,620,901 A | 4/1997 | Kauvar | |
| 5,746,817 A | 5/1998 | Katsen et al. | |
| 6,638,982 B2 | 10/2003 | Brown | |
| 6,726,759 B2 | 4/2004 | McElligott et al. | |
| 6,746,527 B1 | 6/2004 | McElligott et al. | |
| 6,767,396 B2 | 7/2004 | McElligott et al. | |
| 8,815,393 B2 | 8/2014 | Contadini et al. | |
| 9,323,485 B2 | 4/2016 | Villwock | |
| 9,390,846 B2 | 7/2016 | Villwock | |
| 9,821,567 B2 | 11/2017 | Villwock | |
| 10,051,146 B2 | 8/2018 | Villwock | |
| 10,184,057 B2 | 1/2019 | Villwock | |
| 2001/0013882 A1 | 8/2001 | Niedermeyer et al. | |
| 2001/0017641 A1 | 8/2001 | Kobayashi et al. | |
| 2001/0024225 A1 | 9/2001 | Ishizawa et al. | |
| 2002/0122568 A1 | 9/2002 | Zhao | |
| 2004/0080777 A1 | 4/2004 | Smith | |
| 2005/0242297 A1 | 11/2005 | Walker | |
| 2007/0178295 A1 | 8/2007 | Haas et al. | |
| 2007/0285723 A1 | 12/2007 | Fabel et al. | |
| 2008/0010215 A1 | 1/2008 | Rackley, III et al. | |
| 2009/0087077 A1 | 4/2009 | Nireki | |
| 2009/0179974 A1 | 7/2009 | Kimura | |
| 2009/0213161 A1 | 8/2009 | Murai | |
| 2009/0278919 A1 | 11/2009 | Ramstad | |
| 2009/0279143 A1 | 11/2009 | St. Jacques, Jr. et al. | |
| 2010/0050901 A1 | 3/2010 | Biris et al. | |
| 2011/0134223 A1 | 6/2011 | Zomet et al. | |
| 2012/0149561 A1 | 6/2012 | Ribi et al. | |
| 2012/0225264 A1 | 9/2012 | Villwock | |
| 2013/0024371 A1* | 1/2013 | Hariramani | G06Q 20/384 705/41 |
| 2013/0032634 A1* | 2/2013 | McKirdy | G06Q 30/0271 235/375 |
| 2013/0078625 A1 | 3/2013 | Holmes et al. | |
| 2013/0153662 A1 | 6/2013 | Narasa Prakash | |
| 2014/0065647 A1* | 3/2014 | Mamenta | G01N 33/54306 435/7.92 |
| 2014/0098243 A1 | 4/2014 | Ghazizadeh | |
| 2014/0256881 A1 | 9/2014 | Berrada et al. | |
| 2014/0272097 A1* | 9/2014 | Jung | B41J 2/01 427/2.1 |
| 2014/0273007 A1* | 9/2014 | Love | G01N 33/57415 422/69 |
| 2014/0283945 A1* | 9/2014 | Jones | A61J 1/1425 141/1 |
| 2015/0083797 A1 | 3/2015 | Tran et al. | |
| 2015/0111780 A1 | 4/2015 | Mercolino | |
| 2016/0077091 A1* | 3/2016 | Tyrrell | G01N 33/48792 436/501 |
| 2016/0208120 A1 | 7/2016 | Fonseca De Souza et al. | |
| 2016/0280946 A1 | 9/2016 | Villwock | |
| 2019/0153253 A1 | 5/2019 | Villwock | |
| 2019/0194484 A1 | 6/2019 | Villwock | |

FOREIGN PATENT DOCUMENTS

| | | |
|---|---|---|
| WO | 2004/003088 A1 | 1/2004 |
| WO | 2004/086286 A2 | 10/2004 |
| WO | 2017/040423 A1 | 3/2017 |

OTHER PUBLICATIONS

PCT/US2017/050835 International Preliminary Report on Patentability dated Oct. 2, 2018.
17849686.5 Extended European Search Report dated May 7, 2020.

\* cited by examiner

A. Genuine Item/
Product Test Ticket/Label

B. Redemption
Ticket/Label

C. Proof of Identity/
Authorization Ticket/Label

D. Proof of Authenticity
Ticket/Label/Strip

Unique pattern/QR code combination revealed within seconds after INKcrypt Initiation process  410

METHODS AND SYSTEMS FOR AUTHENTICATING GOODS AND SERVICES USING ELECTRONIC ANALYSIS OF ANALYTE ENCODED COMPOSITIONS

CROSS REFERENCE TO RELATED APPLICATIONS

This is a continuation in part of U.S. patent application Ser. No. 16/331,245, filed Mar. 7, 2019, which itself is a U.S. national phase entry under 35 USC § 371 of international patent application no. PCT/US2017/050835, filed Sep. 8, 2017, which claims priority to U.S. provisional patent application No. 62/385,036, filed Sep. 8, 2016, U.S. provisional patent application No. 62/393,510, filed Sep. 12, 2016; and U.S. provisional patent application No. 62/453,396, filed Feb. 1, 2017. Each document cited in this paragraph is herein incorporated by reference in its entirety.

This application also claims priority to U.S. provisional patent application No. 62/699,466, filed Jul. 17, 2018 and U.S. provisional patent application No. 62/791,684, filed Jan. 11, 2019. Each document cited in this paragraph is herein incorporated by reference in its entirety.

REFERENCE TO SEQUENCE LISTING SUBMITTED ELECTRONICALLY

The official copy of the sequence listing is submitted electronically via EFS-Web as an ASCII formatted sequence listing with file "10188-201589_2017-09-08_SEQ_ID" created on 7 Sep. 2017 and having a size of 2 Kilobytes. The sequence listing contained in this ASCII formatted document forms part of the specification and is herein incorporated by reference in its entirety.

BACKGROUND OF THE INVENTION

The invention relates to methods for authenticating goods to prevent counterfeiting and more specifically to authentication methods using analyte encoded compositions and electronic analysis and reporting of test results.

Counterfeit goods are generally made to ride off the goodwill of brands that consumers know and trust. Counterfeit goods span across multiple industries including anything from apparel, music, software, medications and cigarettes to automobile and airplane parts, toys and electronics.

Counterfeiting is not a victimless crime. Counterfeiters often prey on consumer's desires for low prices, but that cheap price comes at a high cost to multiple parties. For example, in addition to mere profit loss, counterfeit goods can be dangerous. Counterfeit medications commonly available over the Internet and in brick and mortar stores have been found to include toxic substances, such as lead paint and thus present a serious health hazard. Further, purchase of counterfeit goods from counterfeit merchants can place purchasers at increased risk of identity theft and credit card fraud.

Accordingly, there is a need for improved methods and systems for authenticating goods to avoid counterfeits.

SUMMARY OF THE INVENTION

The invention addresses the need for improved methods and systems for authenticating articles, which includes various goods and tangible objects (e.g. receipts, certificates of authentication, etc.) provided in connection with services. The technical approach can be used with any packaging or tag associated with a good, the good itself, or service in need of authentication. Nonlimiting examples of such articles include documents, jewelry, clothing, clothing accessories, currency, checks, tickets, and in general any tangible item with high perceived value or good will value, which is at risk of theft, fraudulent manipulation, illegal copying, counterfeiting and infringement of protected rights. This is achieved in one aspect of the invention by a method for authenticating an article (e.g. good or product) or service, the method including: providing an article having a substrate with an analyte encoded composition; obtaining a sample of the composition; applying the sample to a test device to obtain test results; and analyzing test results from the test device using an electronic device communicatively connected to an authentication authority.

In some embodiments, the analyte encoded composition is applied by way of printing or stamping. Typically, the composition is provided within a fluid carrier for application, thereby forming an analyte encoded security fluid. The fluid can be applied using a variety of publishing or printing platforms, such as offset printing, flexo, gavure, and any a digital printer/press approach. The analyte encoded security fluid can be sprayed or brushed onto the substrate. In some embodiments, the fluid is an ink. In further embodiments, the ink is configured for inkjet printing.

The analyte can be a double stranded nucleic acid sequence or a single stranded nucleic acid sequence. The analyte can be an organic or an inorganic compound. The analyte can be a polypeptide. In some embodiments, the analyte includes a binding moiety, such as biotin for binding to a detecting or capture reagent.

In some embodiments, the analyte includes a binding moiety, and the method further includes exposing the analyte to a label bound to a complementary binding moiety to permit binding to the binding moiety. The binding moiety and complementary binding moiety bind by biotin-avidin binding, antibody or antibody fragment—antigen binding, receptor-ligand binding, DNA-DNA hybridization, or others. In preferred embodiments, the label is a detectable particle, optionally selected from the group consisting of a latex bead, a magnetic particle, a magnetizable particle, a fluorescent molecule, an enzyme, ultra-violet active particle, and near infra-red active particle.

In some embodiments, the article is encoded with an additional substrate security feature that forms part of or is separate and/or distinct from the analyte encoded composition. In some embodiments, the substrate security feature includes printed indicia that is printed with a downshifting print media that is outside of the visible spectrum until activated. In some embodiments, the substrate security fluid includes a fluorescent colorant.

In some embodiments, the substrate security feature includes a stereoscopic image selectively viewable under ultraviolet light. In further embodiments, the stereoscopic image is printed as a pair of interlaced images on the substrate, with at least two different downshifting print media formulations, wherein at least two of the downshifting print media formulations selectively emit a different wavelength in the visible spectrum upon activation with ultraviolet light. The interlaced images can be printed with an inkjet printer or in a single pass of a dot-on-demand inkjet printer. The interlaced images can be copies of a same image or can be different images.

In some embodiments, the stereoscopic image is viewed through two lenses, wherein each lens is aligned for viewing through a different eye, further wherein a first lens filters out a portion of the visible spectrum emitted by a first downshifting print media formulation and a second lens filters out a portion of the visible spectrum emitted by a second downshifting print media formulation.

The substrate security feature can be hidden or the substrate can include visible indicia indicating positioning of the security feature on the substrate.

The sample containing the analyte can be obtained by swiping dried analyte composition or dried fluid with a solvent loaded collecting wand. A particularly useful collecting wand was developed, which includes an absorbent tip loaded with the solvent; a housing having a chamber with fenestrations or throughbores configured for delivering wash fluid from the chamber to the tip, and a pump, optionally embodied as a plunger, that pumps the wash fluid through the fenestrations, and a removable cap configured to seal the fenestrations when closed, optionally using sealing prongs, and open the fenestrations when removed.

In other embodiments sample is obtained by scraping the dried analyte composition from the article and at least partially dissolving the dried analyte encoded composition with a suspending solution.

The sample is tested by detecting the presence or absence of the analyte using a test device, which includes a substrate having an array of immobilized capture molecules to capture the analyte in a capture pattern, and a test device code.

In some embodiments, the test device has a substrate embodied as a test strip, such as a nitroceullulose test strip.

In some embodiments, the test strip is a lateral flow test strip including a sample mixing zone and a detection zone. The sample mixing zone can be loaded with a detectable reagent that binds the analyte or a binding moiety conjugated to the analyte.

In other embodiments, the immobilized capture molecules are positioned around a sample application zone. In such an embodiment, the sample may radially spread to access the immobilized capture molecules. In further embodiments, a sample mixing zone is arranged radially between a central sample application zone and the immobilized capture molecules.

The array of immobilized capture molecules are configured to capture a same or different analyte. The array of immobilized capture molecules can be configured to capture at least two different analytes to reveal different capture patterns. In some embodiments, the at least two different analytes are labeled with a same label. In other embodiments, the at least two different analytes are labeled with at least two different labels.

The array of immobilized capture molecules can be an array of nucleic acids or an array of polypeptides, optionally antibody or antibody fragments.

Security is improved when the test device has a test device code that that associates the test device with a capture pattern. In preferred embodiments, the test device code is written in a computer readable format, such as, but not limited to a quick respond code (QR code), an augmented reality code (AR code), and a barcode.

In some embodiments, the computer readable format is written in part with the analyte encoded composition. In such embodiments, the computer readable format permits decoding of the test device code and the composition for testing can be collected from the printing itself.

In some embodiments, the test device includes a computer readable format, optionally a QR code or an AR code, configured to direct an Internet web browser to an Internet web page for pairing the device code with the capture pattern and optionally a substrate security feature. The test device can include a computer readable code, optionally a QR code or an AR code, configured to direct a web browser to an Internet web page for authentication of the capture pattern and optionally a substrate security feature.

In some embodiments, the test device code is electronically stored in a near field communication (NFC) circuit or a radio frequency identification (RFID) circuit.

In some embodiments, the test device code is a string of characters for manual input, optionally written in part with the analyte encoded composition.

Analyzing the test results includes using an electronic device to communicatively connect to an authentication authority. Test results can be manually inputted into the electronic device corresponding to the capture pattern, or test results can be electronically inputted into the electronic device from capture pattern imaging.

In some embodiments, the electronic device transmits the test device code to the authentication authority and receives a data file providing authenticating test results for comparison. In some embodiments the data file displays an authenticating array of immobilized capture reagents on a graphical user interface for visual comparison to the test results and optionally a substrate security feature.

In some embodiments the array pattern is presented as an option among a plurality of potential array patterns by the authentication authority for choosing by the user. The test results are then manually inputted by selecting a selectable option offered in the graphical user interface (GUI).

In some embodiments, the test results are manually inputted and the step of inputting test results includes selecting positions within a graphical user interface (GUI) corresponding to the viewed capture pattern.

In some embodiments, the test results are manually inputted and the step of inputting test results includes inputting a series of numbers or letters corresponding to a series of fields within the viewed capture pattern.

In other embodiments, the test results are uploaded to the authentication authority as an image file formed by the electronic device. In some embodiments, the authentication authority provides electronic instructions for camera alignment by the electronic device.

In some embodiments, test results are electronically inputted into the electronic device by electrical communication with a spectrophotometric analyzer or incorporates a spectrophotometric analyzer. In some embodiments, the electronic device includes or is communicatively coupled to a spectrophotometric analyzer that emits ultra-violet and/or near infra-red wavelengths to detect the capture pattern.

In some embodiments, the test results are transferred to the authentication authority for authentication, and the authentication authority sends a notification confirming or denying authenticity after comparison with an authentication database of authentic test results. Authentic test results can be predetermined by a user during a setup process. In some embodiments, the notification of authenticity is electronically to a user account. In some embodiments, notification of authenticity is by way of text message or electronic mail. In some embodiments, notification of authenticity displays identifying product information. In some embodiments authentic test results display a chain of possession, optionally from manufacturer to retailer or to end purchaser.

In some embodiments the test results are transferred to the authentication authority by way of the Internet.

BRIEF DESCRIPTION OF THE DRAWINGS

Embodiments of the invention can be better understood with reference to the following drawings, which are part of the specification and represent preferred embodiments. The components in the drawings are not necessarily to scale, emphasis instead being placed upon illustrating the principles of the invention. And, in the drawings, like reference numerals designate corresponding parts throughout the several views.

In FIG. 17, a fluid pouch is positioned below a test strip (not shown).

DETAILED DESCRIPTION OF PREFERRED EMBODIMENTS

Figure 1:
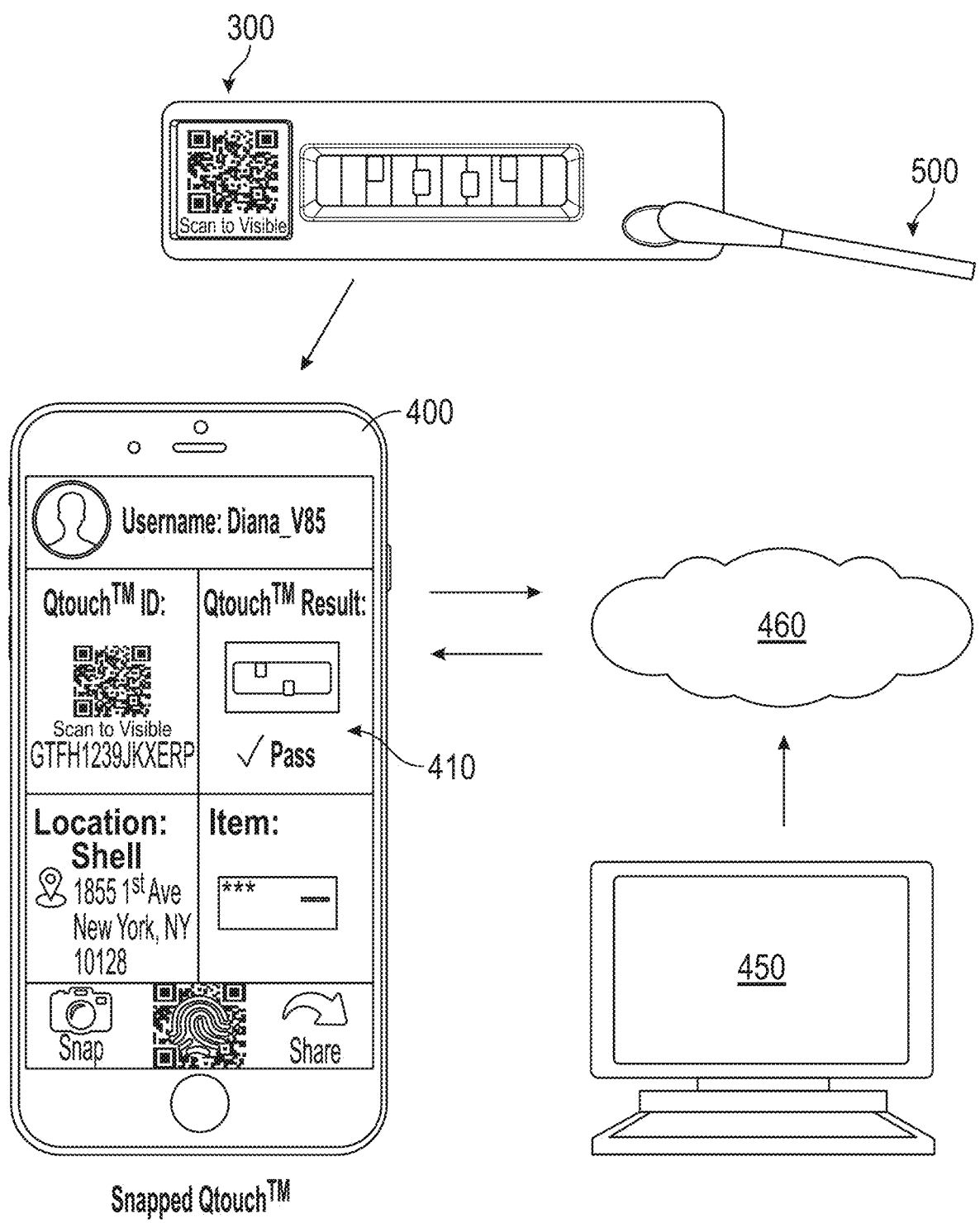
FIG. 1 depicts an overview of a preferred method showing reading of test results from a test device 300 by a mobile phone 400 and the communication of test results for authentication to an authentication authority 450 over the Internet 460 and receiving corresponding confirmation of authentication.

The invention provides improved methods and systems for counterfeit prevention. The technical approach can be used with any packaging or tag associated with an article or the article itself in need of authentication. In some embodiments, the methods and systems are envisioned to authenticate articles, such as pharmaceuticals and medications. The methods and systems are also envisioned to be used to authenticate designer brands of clothing and clothing accessories, which are commonly counterfeited, to prevent riding off the good will of designers and artists. Further, the methods and systems are also envisioned for use with a variety of documents, such as certificates, where authentication is desired. The invention is also useful for redemption tickets/labels. Still further, the method can be used with any tangible item with high perceived value or good will value, which is at risk of theft, fraudulent manipulation, illegal copying, counterfeiting and infringement of protected rights. Furthermore, the methods can be performed throughout a supply chain, from manufacturing to final use.

In preferred embodiments, the methods and systems rely on security features applied to a substrate requiring specially designed detection systems, which can authenticate content applied to the substrate and in some embodiments separately authenticate the substrate itself. Furthermore, test results can be further encoded by way of establishing secure, paired profiles and confirming the profiles by communication with an authentication authority, embodied as a remotely accessible computerized system. Communication with the authentication authority has been still further approved by a software application loadable on a mobile electronic device.

Turning now to FIGS. 1-18, the invention provides methods for authenticating articles by detecting an analyte 312 from an analyte encoded composition 100, preferably embodied in a fluid for application to a substrate 200. An exemplary method for product authentication can include providing an article having a substrate 200 with an analyte encoded composition 100 requiring authentication; obtaining a sample of the composition 100 from the substrate 200; and testing the sample for the presence of the analyte 312 in a capture pattern 410 assigned to a test device 300. The presence of the analyte 312 in the capture pattern 410 confirms the authenticity of the good, and the absence of the analyte 312 or an improper capture pattern 410 suggests the substrate is a counterfeit.

As used herein, the term "analyte" refers to a molecule intended for capture within a capture pattern 410. The term "analyte encoded composition" as used herein refers to the analyte provided in a carrier, whether a liquid, gas, or solid. The term "analyte encoded fluid" or "analyte encoded security fluid" as used herein refers to a liquid suspension including the analyte or a liquid suspension including the analyte that has subsequently dried.

The analyte encoded fluid includes a detectable analyte 312 suspended in a solvent that is suitable for applying to a substrate 200. As such, the precise formulation of the fluid may vary according to the properties of the substrate 200 and according to the technique for delivering the fluid to the substrate 200. As such, the fluid may include additives, such as one or more surfactants, humectants, biocides, and dispersion aids to assist with delivery or application to the substrate.

The analyte encoded fluid can be formulated and thus applied to a substrate 200 using a variety of techniques, such as but not limited to printing with a printer, stamping with a stamp, marking with a pen or marker, and others. The fluid can be applied using a publishing or printing platform, such as but not limited to offset printing, flexo, gavure and any digital printer/press approach.

Offset printing is a printing technique where an inked image is transferred or offset from a plate to a blank, then to a printing surface. In offset printing the image to be printed obtains ink from ink rollers while the non-printing area attracts a water based film, keeping the non-printing areas ink free. Flexography (flexo) is a form of printing that utilizes a flexible relief plate that can be used for printing on almost any type of substrate 200, including plastic, metallic films, cellophane and paper. Rotogravure (gravure) is a type of intaglio printing, which involves engraving an image onto a cylindrical image carrier for use in a rotary printing process.

The analyte encoded fluid can be adapted for any of these applications. Furthermore, the analyte encoded fluid can be applied by spraying, brushing, sprinkling, jetting or any other approach known in the art to which the invention belongs. In some embodiments, the fluid is printed using an inkjet printer.

As introduced above, the viscosity and surface tension of the fluid may vary depending on the method used to apply the analyte encoded fluid to the substrate 200 requiring authentication and the substrate 200 itself. As a general guideline, fluids for inkjet printing on documents typically have a viscosity of about 1 to 50 centipoise and surface tension of about 20-45 dynes.

When marking a substrate 200 with a pen or marker carrying the analyte encoded fluid, the fluid can be further formulated to comply with ISO 14145-1 for general substrates or ISO 14145-2 for documents; however, this is not required. When applying the fluid by use of a stamp, the fluid can generally be more viscous than inkjet formulations and marker formulations since such approaches do not typically induce a flow to dispense the fluid.

While the analyte encoded fluid does not require a pigment or colorant, in preferred embodiments the analyte encoded fluid can be embodied as an ink to facilitate testing. The term "ink" as used herein refers to a liquid or paste that contains pigments, dyes or colorants used to color a surface to produce an image, text or design. Inks can be a complex medium of solvents, pigments, dyes, resins, lubricants, solubilizers, surfactants, particulate matter, fluorescents and other materials. Although in preferred embodiments, the fluid also includes a colorant or a pigment to identify the position of the authenticating analyte, in some embodiments the analyte encoded fluid has a UV visible fluid and/or invisible IR absorbing fluid, which permits the location of the analyte 310 to be hidden until exposed to a UV and/or IR spectrum. Whether inks are visible without aid or require excitation to be visible, the inks are used as a preferred carrier for applying one or more analytes 310 to the substrate 200, used as an identifier indicating the placement of the analyte 310 on the substrate 200, and used as a carrier for analyte removal for transfer to the test device 300. Although the ink can be formulated for a variety of printing techniques, in some embodiments the ink is formulated for inkjet printing.

The analyte 310 itself is preferably a biological molecule due to the availability of complementary binders for analyte capture within the test device 300 but it is not an absolute requirement. The analyte 310 can be any molecule, whether organic or inorganic, that can be transferred to a substrate 200, removed from the substrate 200 and tested for its presence using a capture approach with an immobilized molecule 320 (also referred to as a "capture reagent" or "capture molecules"). By "immobilized" it is meant that the capture reagent or molecule is fixedly positioned at the time test results are assessed. As such, the capture molecules may be mobile prior to their immobilization.

In some embodiments the analyte 310 is a peptide. A peptide is chain of amino acid monomers linked by amide bonds. More preferably, the analyte 310 is a polypeptide. A polypeptide is a long, continuous, unbranched peptide chain. Capture molecules or reagents 320 can be generated against peptides and polypeptides using antibody production methodologies, which are known to those having ordinary skill in the art to which the invention belongs.

Still more preferably, the analyte 310 is a nucleic acid molecule. Nucleic acids are biopolymers composed of nucleotides made of three components, a 5-carbon sugar, a phosphate group and a nitrongenous base. If the simple sugar is a simple ribose, the polymer is ribonucleic acid (RNA). If the sugar is derived from ribose as deoxyribose, the polymer is deoxyribonucleic acid (DNA). In nature, complementarity is the base principle of DNA replication and transcription, such that when they are aligned antiparallel to each other, the nucleotide bases at each position in the sequences will be complementary. This complementary base pairing allows cells to copy information from one generation to another and even find and repair damage to the information stored in the sequences. By providing an analyte 310 embodied as a single stranded nucleic acid, a capture reagent 320 can be generated by providing its reverse complement such that guanine pairs to cytosine and adenine pairs to thymine. Yet in some embodiments, the analyte 310 is embodied as a double stranded nucleic acid molecule and exposed to a heating element that heats the analyte 310 above its melting temperature to produce a single stranded nucleic acid molecule for capture by the capture reagent 320.

When the analyte 310 is a nucleic acid, preferably it has a length of about 20 to 60 nucleotides, more preferably about 25-35 nucleotides. Further, when the analyte 310 is a single stranded nucleic acid molecule, the nucleic acid sequence is designed to avoid or discourage strong loops and dimerization. Such analysis can be confirmed using a variety of software programs known in the art to which the invention belongs. Non-limiting examples of single stranded nucleic acid molecules that can used in the invention include the nucleotide sequences of SEQ ID NOS. 1-4.

The length of the nucleic acid molecule as well as its GC content determines its melting temperature, which together with its sequence can be used to authenticate substrates 200. To this end, the analyte 310 is typically designed in tandem with its reverse complement for use as its capture reagent 320. By varying the GC content, the melting temperature of a captured analyte 310 can vary. This variance in melting temperature can be exploited for further security by adding additional single stranded nucleic acid molecules, which bind to the analyte 310, but have a lower melting temperature. In such an embodiment, the additional single stranded nucleic acids may bind the analyte 310 to provide a protective structure, thereby preventing or reducing analyte 310 breakage. In other embodiments, the additional single stranded nucleic acids may act as decoy to prevent unwanted sequencing of the analyte 310. That is, the additional single stranded molecules may disguise the authenticating nucleic acid sequence within the analyte encoded composition 100. In furtherance of this, the additional single stranded nucleic acids can have mismatches with the analyte 310, thereby generally reducing the melting temperature between analyte 310 and additional single stranded nucleic acids. Using this approach, the mismatched single stranded nucleic acids are permitted to bind the analyte 310 at room temperature, but melt at a temperature above room temperature but below an absolute match. By coupling this approach with a resistor, thermosister or heating element positioned within the test device 300 and elevating the temperature within the test device 300 above the melting temperature of the mismatch but below the melting temperature of a perfect match, the analyte 310 is freed and permitted to bond to its complement, embodied as the capture reagent 320.

In some embodiments the nucleic acid analyte-capture reagent pair is designed with a melting temperature that withstands heat generated by a heating element positioned at a mixing zone 330 and/or in a detection zone 340, and optionally along the path to the detection zone 340, which helps reduce potential background from interfering nucleic acids.

In some embodiments the analyte encoded composition 100 includes a single stranded nucleic acid molecule as analyte 310 and double stranded or single stranded DNA molecules to further mask the identity of the analyte 310 (also referred to as masking DNA). In such instances, the double or single stranded DNA molecules are designed such that they are less than a 50% complement to the analyte 310. In some embodiments masking DNA has less than 25% complementarity to the analyte 310. In some embodiments masking DNA has less than 10% complementarity to the analyte 310. In some embodiments masking DNA has less than 5% complementarity to the analyte 310. In some embodiments masking DNA has less than 1% complementarity to the analyte 310. In some embodiments, there is more masking DNA than analyte DNA in the analyte encoded composition 100.

In some embodiments the melting temperature of the nucleic acid molecule forming the analyte 310 is over 40 degrees Celsius. In some embodiments, the melting temperature is over 50 degrees Celsius. In some embodiments, the melting temperature is over 60 degrees Celsius. In some embodiments, the melting temperature is below 65 degrees Celsius.

In some embodiments the analyte 310 is conjugated to a binding moiety 350 that itself can strongly bind a complementary binding partner 360. In particular, the binding moiety 350 is chosen such that it can bind to the complementary binding partner 360 during an authentication step. In some embodiments the binding moiety 350 is biotin, an agent for binding to an avidin, during authentication. Biotinylating an oligonucleotide permits analyte 310 capture to an immobilized capture reagent 320 via complementary nucleotide binding and binding to a label 370, such as a latex bead, by conjugating the label 370 to a complementary binding partner 360 embodied as avidin.

The skilled artisan will appreciate that binding moiety 350 and complementary binding partner 360 can bind by biotin-avidin binding, antibody or antibody fragment-antigen binding, receptor-ligand binding, DNA-DNA hybridization, or others. In preferred embodiments, the label 370 is a detectable particle, optionally selected from the group consisting of a latex bead, a magnetic particle, a magnetizable particle, a fluorescent molecule, an enzyme, ultra-violet active particle, and near infra-red active particle.

The skilled artisan will appreciate that as an alternative to the above technique, an analyte 310 conjugated to a binding moiety could bind an immobilized complementary binding partner (complementary to the binding moiety) as capture molecule 320 and bind to a complementary nucleic acid strand having a label 370 for detection.

In still another approach, an analyte 310 of sufficient length could bind to an immobilized complement at one end and to a labeled complement at the opposing end such that both the capture reagent and detecting reagent are complementary to the analyte 310, albeit at different ends.

In furtherance of the above, an exemplary analyte encoded security fluid 100 is formulated with an analyte 310 embodied as a nucleic acid for use in ink jet printing. The analyte 310 is a single stranded 30 mer oligonucleotide according to SEQ ID NO: 1—GGC CGG TAA GCT GCA GAA GAC ATT GAC AGT—having a GC content of 53% and a basic melting temperature with its reverse complement of 64.4 degrees Celsius. SEQ ID NO. 1 is designed such that there is no potential hairpin formation, no 3' complementarity, and no self-annealing sites. SEQ ID NO. 2—ACT GTC AAT GTCTTC TGC AGC TTA CCG GCC—which is the reverse complement, is chosen as a capture reagent 320. An inkjet formulation is prepared according to TABLE 1 and adjusted to a viscosity to 25 centipoise and to a surface tension of 30 dynes.

TABLE 1

INKJET FORMULATION WITH OLIGONUCLEOTIDE

| Component | Composition | Purpose |
| --- | --- | --- |
| Water | 50-90% | Solvent, carrier fluid |
| Colorant | 0-10% | Add vibrancy |
| Co-solvents | 5-50% | Humectants, enhance ink formation on paper |
| Surfactants | 0-5% | Improve wetting and flow through nozzle |
| Polymeric binders | 0-10% | Increase durability and appearance of print |
| Other additives: biocides | 0-1% | Prevent bacteria growth |
| SEQ ID NO. 1 conjugate Optional | 100 ug DNA/mL | Authentication |

The inkjet formulation is loaded into an inkjet print cartridge. Clothing labels are printed with an inkjet printer loaded with the formulation and sewn to the clothing.

As another example, an exemplary analyte encoded fluid is formulated with an analyte 310 embodied as a nucleic acid for use in ink jet printing. The analyte 310 is a single stranded 25 mer oligonucleotide according to SEQ ID NO: 3—TAC AAG ATT CAC AAC TTG GTA TAC T—having a GC content of 32% and a basic melting temperature with its reverse complement of 51 degrees Celsius. SEQ ID NO. 3 is designed such that there is no potential hairpin formation, no 3' complementarity, and no self-annealing sites.

SEQ ID NO. 4—AGT ATA CCA AGT TGT GAA TCT TGT A—which is the reverse complement, is chosen as a capture reagent 320. An inkjet formulation is prepared according to TABLE 2 and adjusted to a viscosity to 25 centipoise and to a surface tension of 30 dynes.

TABLE 2

INKJET FORMLUATION WITH OLIGONUCLEOTIDE

| Component | Composition | Purpose |
|---|---|---|
| Water | 50-90% | Solvent, carrier fluid |
| Colorant | 0-10% | Add vibrancy |
| Co-solvents | 5-50% | Humectants, enhance ink formation on paper |
| Surfactants | 0-5% | Improve wetting and flow through nozzle |
| Polymeric binders | 0-10% | Increase durability and appearance of print |
| Other additives: biocides | 0-1% | Prevent bacteria growth |
| SEQ ID NO. 3 conjugate Optional | 100 ug DNA/mL | Authentication |

The inkjet formulation is loaded into an inkjet print cartridge. Packaging is printed with an inkjet printer loaded with the formulation and sewn to the clothing.

Authentication includes testing for the presence of the analyte 310 in the analyte encoded composition 100. Testing for the presence of the analyte 310 in the analyte encoded composition 100 preferably includes physical removal of a sample; however, sample removal is not typically noticeable. Preferably the sample for testing is collected from the substrate in a way that minimally affects the substrate itself.

Figure 2:
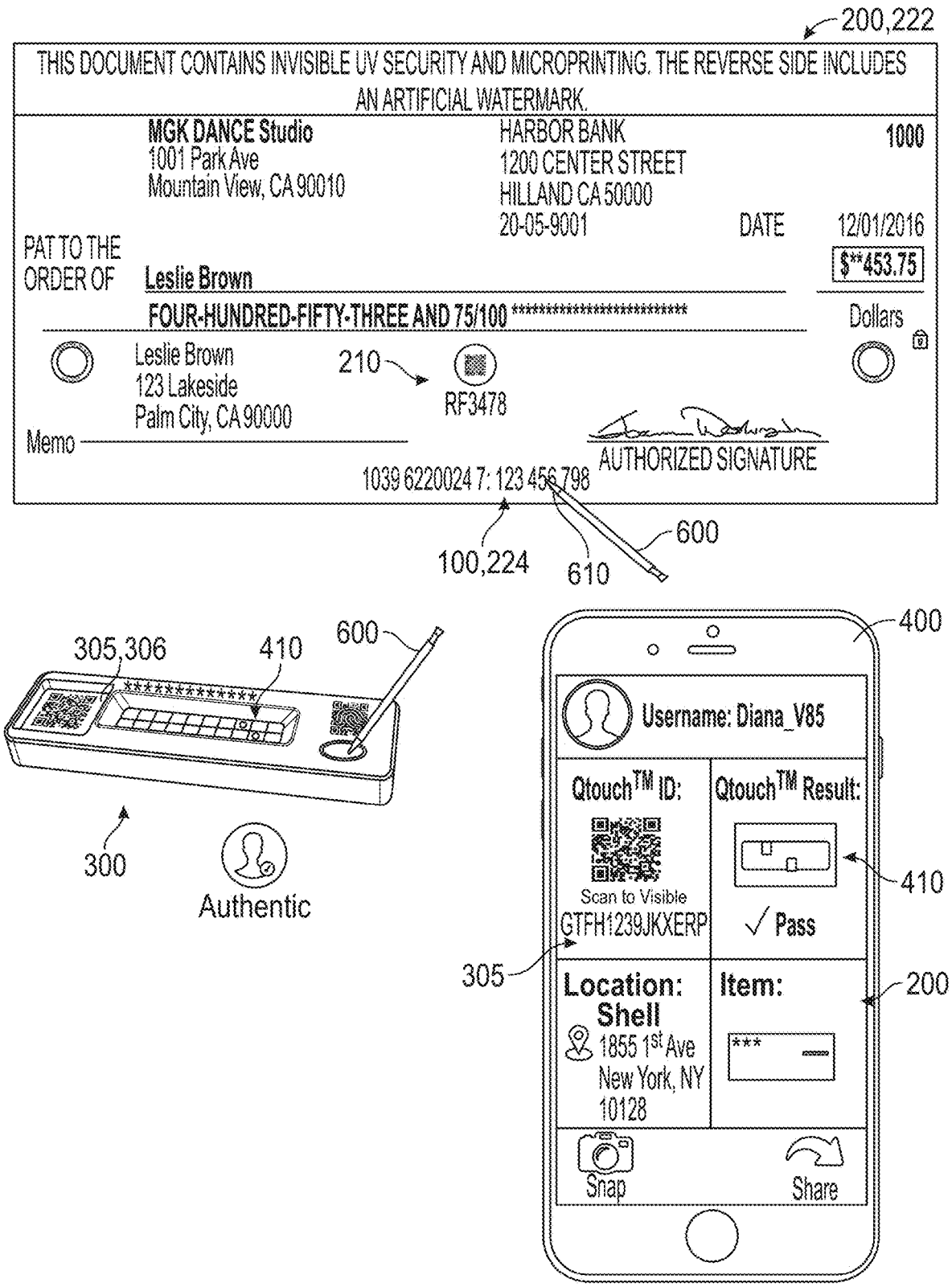
FIG. 2 depicts an overview of a preferred method where an analyte encoded security fluid 100 is printed on a substrate 200 embodied as a check 222 (at the MICR line 224), a sample is collected and tested for the presence of analyte in a capture array using a test device 300, and the results communicated using a mobile phone 400 for authentication, where the results include a QR encoded test device code 305, and an image of the capture pattern 410. Pass results are communicated back to the mobile phone 400 confirming authentication and displayed to the user. Further confirmation of the substrate 200 is performed by revealing a substrate security pattern 210 under ultraviolet light.
Figure 3:
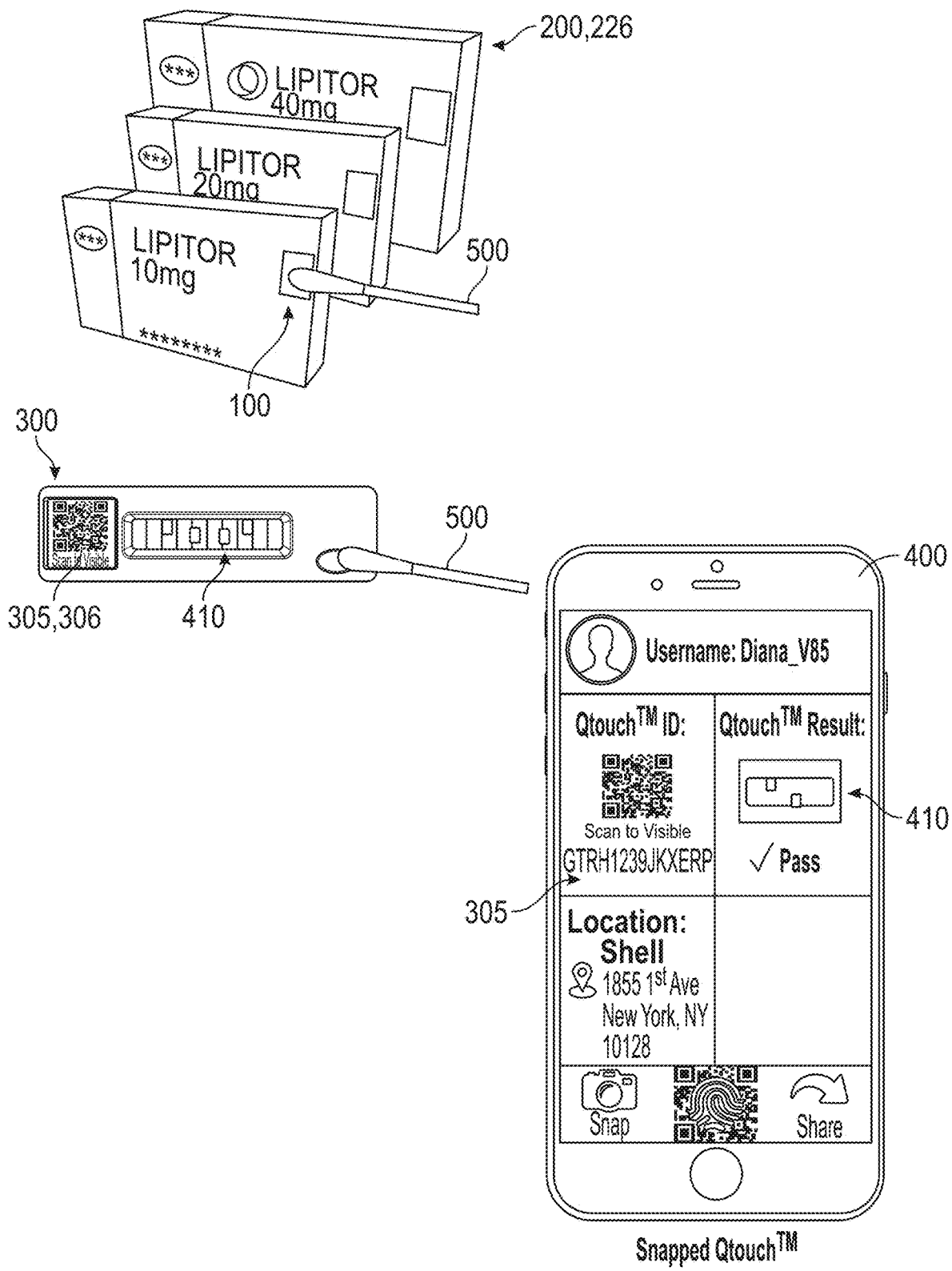
FIG. 3 depicts an overview of a preferred method where an analyte encoded security fluid 100 is printed on packing 226 of a pharmaceutical, a sample is collected and tested for the presence of analyte in a capture array using a test device 300, and the results communicated using a mobile phone 400 for authentication, where the results include a QR encoded test device code 305 and an image of the capture pattern 410. Pass results are communicated back to the mobile phone 400 confirming authentication.
Figure 4:
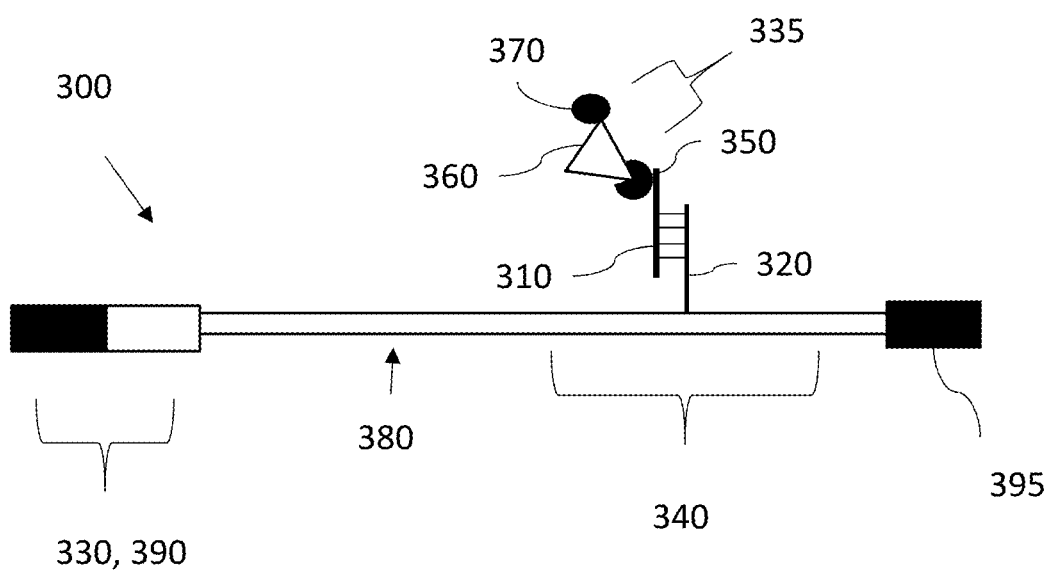
FIG. 4 depicts an overview of a test device 300 having a test strip 380 with an immobilized capture reagent 320 capturing an analyte 310, which itself is also bound to a labeled detecting reagent 335.

In some embodiments, a sample is collected by swiping the dried analyte encoded composition 100 with a solvent and a swab 500 (see FIG. 3). In other embodiments a sample is collected by swiping the dried analyte encoded composition 100 with a solvent and a collecting wand 600 substantially as depicted in FIG. 2 and optionally FIGS. 11A-B. In this embodiment, the solvent can partially dissolve or loosen the dried composition 100 from the substrate 200 and the collecting wand 600 can physically lift the sample from the substrate 200. In such embodiments, the solvent can be polar or nonpolar depending on the composition 100 and substrate 200. In some embodiments the collecting wand 600 has a tip 610 that is pointed or sharp edge to scrape the sample. The skilled artisan will appreciate that the amount of sample required will depend on the sensitivity of the detecting assay. The detection assay described herein is highly sensitive and thus only a very small amount of sample is required.

Figure 11A:
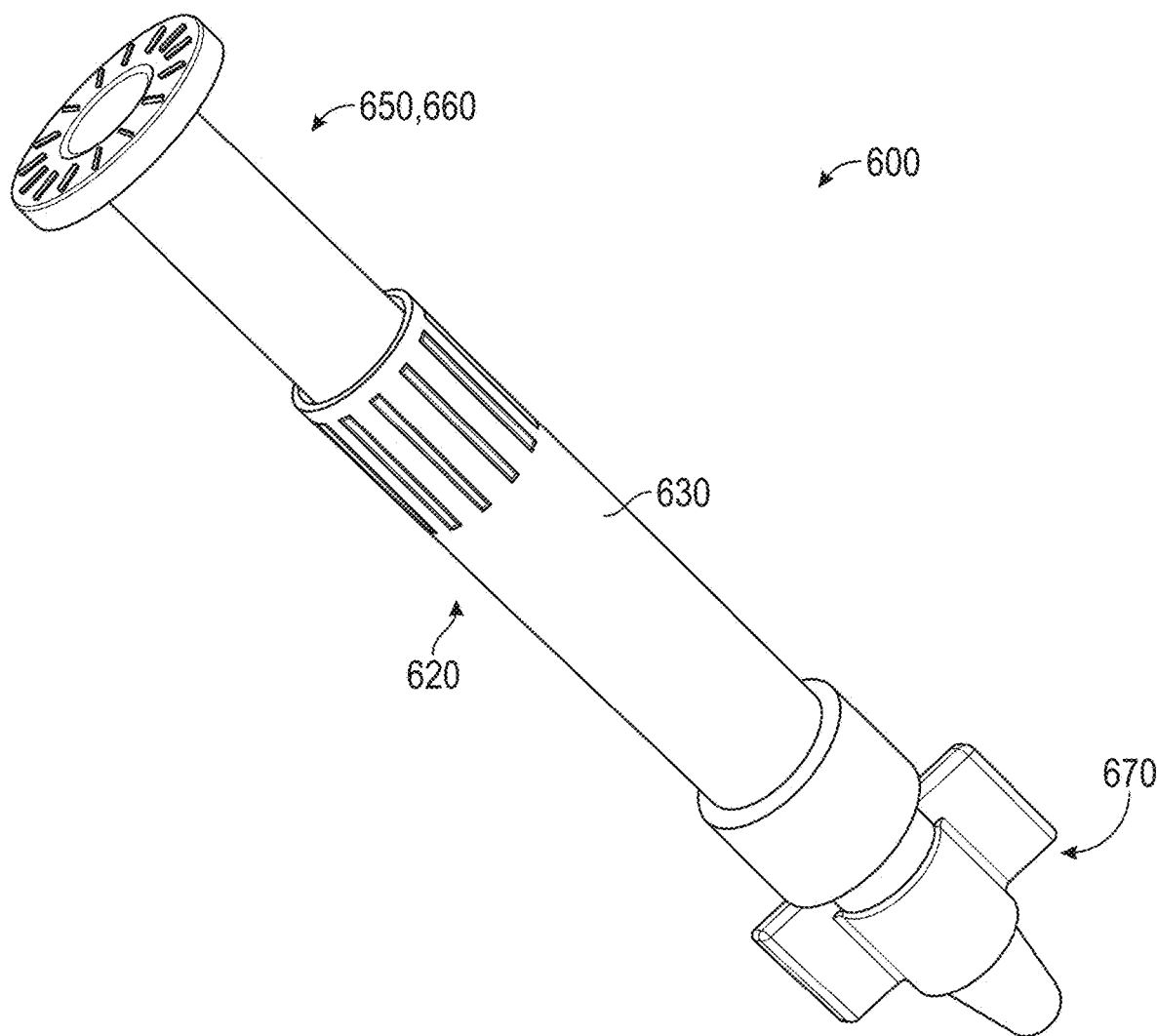
FIGS. 11A-B depict an exemplary collecting wand 600 for collecting a sample.
Figure 11B:
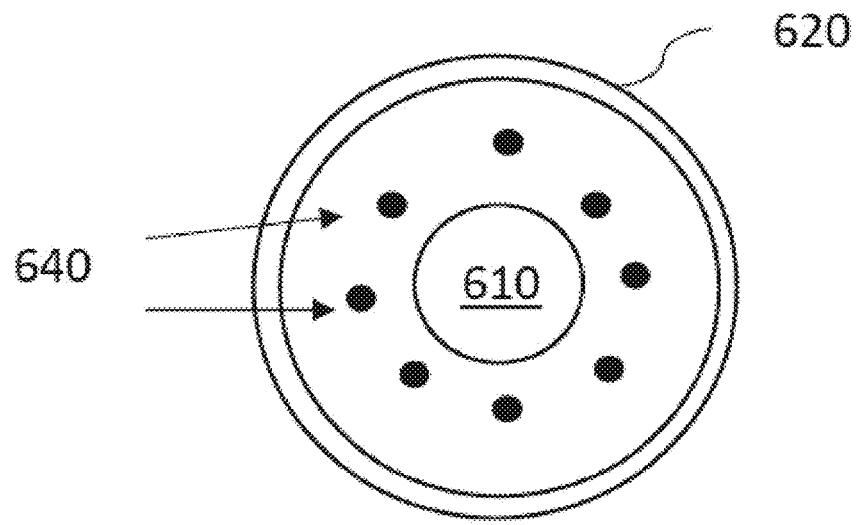

With particular reference to FIG. 11A and FIG. 11B, a collecting wand 600 has been developed that efficiently collects and delivers analyte 310 from an analyte encoded composition 100. A preferred collecting wand 600 includes: an absorbent tip 610 loaded with the solvent; a housing 620 having a chamber 630 with fenestrations 640 configured for delivering wash fluid from the chamber 630 to the tip 610, and a pump 650, optionally embodied as a plunger 660, that pumps the wash fluid through the fenestrations 640, and a removable cap 670 configured to seal the fenestrations 640 when closed and open the fenestrations 640 when removed.

The absorbent tip 610 is preferably preloaded with solvent. Depending on the formulation of the analyte encoded composition 100, the solvent can be polar or non-polar, include a detergent or any other formulation that is able to at least partially dissolve the analyte encoded composition 100 and/or free the analyte 312 from the substrate 200. Removing the cap 670 exposes the absorbent tip 610 preloaded with solvent. The tip 610 is rubbed along the dried analyte encoded composition 100 thereby partially dissolving the dried composition 100, which carries the analyte 310. The release of the analyte 310 from the absorbent tip 610 is by way of activating the pump 650, such as for example, pressing a plunger 660 to pressurize the chamber 630. Pressurizing the chamber 630 pushes the wash fluid through the fenestrations 640 and the causes the wash fluid to flow along the absorbent tip 310, thereby washing the analyte from the tip 310 and into an analyte test device 300. The wash fluid can be any suitable fluid, such as phosphate buffered saline (PBS) or other wash solutions known in the art to which the invention belongs.

Referring now to FIG. 4, the sample can be tested to detect the presence or absence of the analyte 310 on a microfluidic device or on a test device 300 using a test strip 380. Microfluidic devices can be formed by injection molding, or laser ablation of a substrate, or curing a polymer-based substrate using ultraviolet light with a suitable masking to form channels of appropriate depths and widths and lengths. Within the channels can be one or more mixing zones and detection zones consistent with the description of the following test strips 380. Migration through the microfluidic device may be by capillary flow or by positively or negatively pressuring the system.

In some embodiments, the analyte detection device (test device 300) uses a test strip 380. An exemplary test device 300 includes a sample mixing zone 330 and a test strip 380 having a sample application zone 390 and a detection zone 340. The test strip 380 may also be joined to a sink 395 at the terminal end for absorbing fluid that entirely traverses the test strip 380. The typical assay takes about 2 minutes.

The sample mixing zone 330 can be a chamber distinct from the test strip 380 that is accessible using the collecting wand (FIGS. 11A-B: 600). In some embodiments the sample mixing zone 330 is a liquid pouch accessed prior to loading a mixed sample on a sample loading zone 390. In such an embodiment, a wand 600 loaded with an analyte can puncture the barrier of the sample mixing zone 330 for mixing, then removed and pressed against a sample application zone 390 of the test strip 380 to migrate the mixed sample towards the detection zone 340.

In some embodiments, the analyte 310 is flushed into the sample mixing zone 330 by pumping wash fluid from the chamber 630 of the collecting wand 600, through the absorbent tip 610 of the collecting wand 600 and into the test device 300. In furtherance of the above, a sample mixing zone 330 can be separated from the test strip 380 using any suitable approach such as a puncturable barrier that requires puncturing to permit flow of the migration fluid to the test strip 380 or a valve as known in the art to which the invention belongs. In some embodiments the sample mixing zone 330 embodied as a puncturable barrier is positioned beneath the test strip 380. The sample mixing zone 330 is preferably preloaded with a detectable reagent 335 (e.g. binding partner 360 with label 370) that binds the analyte 310 or a binding moiety 350 conjugated to the analyte 310. A variety of techniques can be used to position the detectable reagent 335 (e.g. binding partner 360 with label 370) within the sample mixing zone 330. Among these include lyphilizing the detectable reagent 335 (e.g. binding partner 360 with label 370) such that contact with the wash solution of the collecting wand 600 solubilizes the reagent 335 (binding partner 360 with label 370).

In some embodiments, the detectable reagent 335 includes a labeled single stranded nucleic acid molecule. In other embodiments, the detectable reagent 335 includes a labeled polypeptide, such as an antibody or antibody fragment. In some embodiments detectable reagent 335 has a colored bead as a label 370. In other embodiments, the detectable reagent 335 has an enzyme label 370. Detectable labels 370 can bind the analyte 310 using known binding pairs (e.g. binding moiety 350 and binding partner 360), such as biotin-avidin pairs.

The sample mixing zone 330 can include a detectable label 370, such as a latex bead conjugated to a complementary binding partner 360 that itself is configured to bind a binding moiety-analyte 350, 312 conjugate. Examples of such binding interactions include bio-agent aided interaction and others. Binding interactions can be antibody-antigen interactions, biotin-avidin binding and others known in the art to which the invention belongs. For example, binding moiety and complementary binding moiety bind by biotin-avidin binding, antibody or antibody fragment—antigen binding, receptor-ligand binding, and DNA-DNA hybridization.

In preferred embodiments, a labeled-complementary binding partner 360, 370 conjugate is preferably suspended in a solvent (which could be a migration fluid or wash fluid) that permits binding, migration along the test strip 380 by wicking or chromatographic transport, and capture of the analyte 310 at the detection zone 340. Nonlimiting examples of such migration fluids include pH adjusted phosphate buffered saline (PBS).

In preferred embodiments, a sample application zone 390 introduces the migration fluid, such as the wash fluid from the collecting wand 600, to the test strip 380 and is typically formed from a pad configured to absorb the entire contents of the mixing zone to reducing spilling. By contacting the nitrocellulose to the sample application zone 390, the sample will naturally begin to migrate along the test strip 380.

The test strip 380 transports fluid from the mixing zone 330 for assaying in the detection zone 340. The test strip 380 can be formed from any material that permits chromatographic flow, microfluidic flow or wicking. A non-limiting example includes nitrocellulose. In some embodiments the nitrocellulose is coated with a block and lubricant, such as a sugar to improve fluid flow along the test strip 380.

Figure 5:
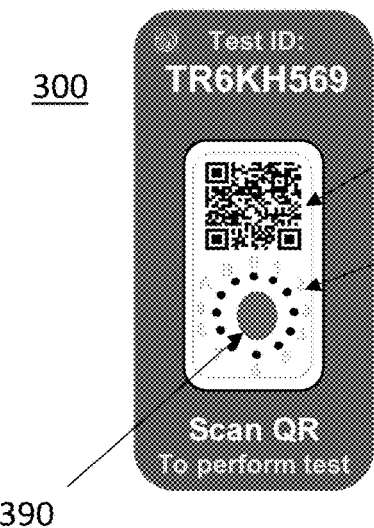
FIG. 5 depicts the test device 300 having a QR code 306 and a circumferential capture pattern 410 for radial spreading of a sample. Panel A depicts use for a product ticket/label; Panel B provides use for a redemption ticket/label; Panel C provides use for authorization of a ticket/label; and Panel D provides use for authorization of a ticket/label/strip.
Figure 5:
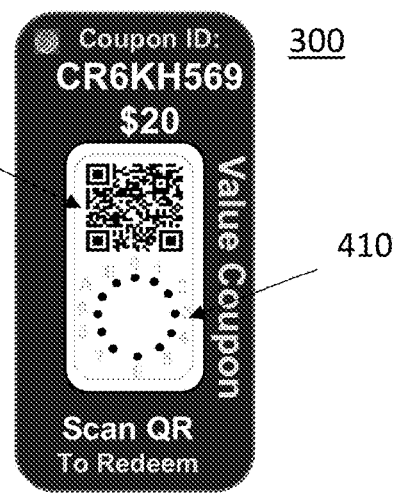
Figure 5:
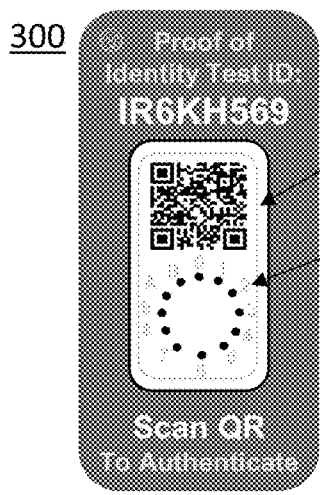
Figure 5:
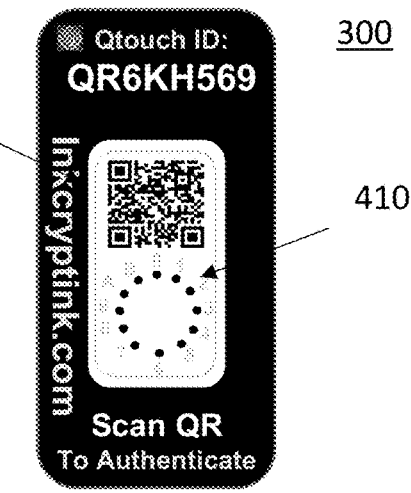
Figure 6:
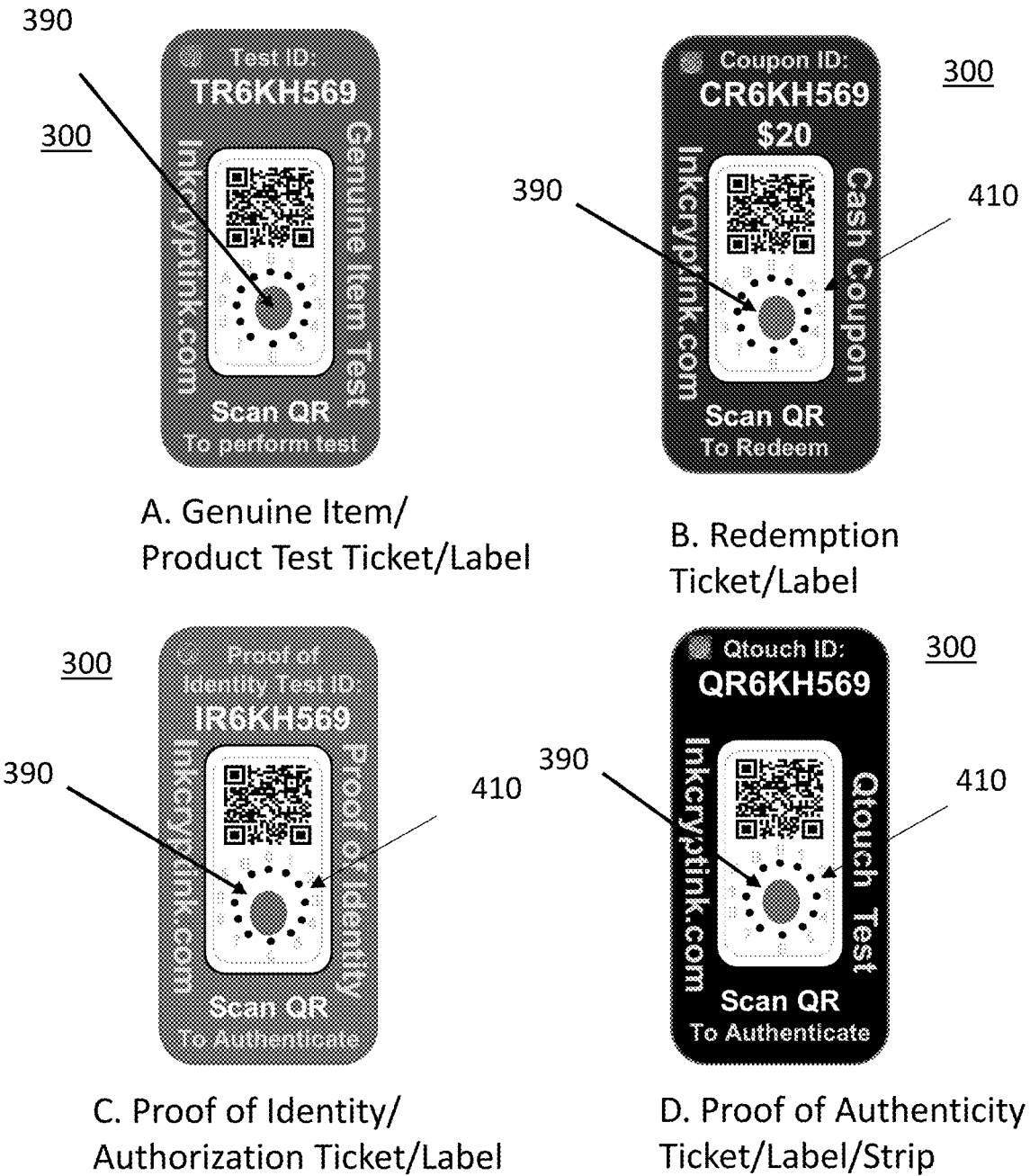
FIG. 6 depicts the test devices 300 of FIG. 5 showing the application of a sample to a centrally positioned application zone 390.

Fluid flow can be substantially lateral, such as along a longitudinally extending test strip 380 (e.g. substantially as depicted in FIGS. 1-3) or can be radially outward (e.g. substantially as depicted in FIGS. 5-6).

The migrating fluid, which is typically composed of wash fluid from the collecting wand 600, transports labeled analyte 310 to a detection zone 340 for capture, which provides a visual readout of the presence or absence of the analyte 310 in the sample.

Preferably, the detection zone 340 includes an array of immobilized capture molecules 320 with specificity for binding to the analyte 310. The immobilized capture molecules 320 are arranged in a capture pattern associated with the test device code 305 (FIG. 2) as further security. Thus, a same analyte can be captured with the same immobilized capture molecules 320 in different capture patterns assigned to different test device codes 305.

The dense loading of the capture reagent 320 in the detection zone 340 causes dense binding of the analyte-label complex thereby visually revealing the detectable label 370, which itself confirms the presence of the analyte 310 and if in the appropriate capture pattern 410, the authenticity of the substrate 200. The lack of binding or binding in an incorrect capture pattern 410 is indicative of the substrate 200 being a counterfeit. One of ordinary skill in the art to which the invention belongs will appreciate that two or more analytes 310 may contain one or a combination of a plurality of distinct analyte-labels 370, which can have a same or different label 370, such as a same or different colored bead.

Preferably, the detection zone 340 includes an array of immobilized capture molecules 320 configured to capture a same or different analyte 310. In some embodiments, the array of immobilized capture molecules 320 includes capture molecules 320 positioned at different regions of the detection zone 340 to form a capture pattern 410. Examples of capture patterns are shown in FIGS. 5-8 and FIGS. 12A-12D. Capture patterns 410 can be arranged along the longitudinal extent of a test strip 380 (e.g. FIG. 12C) circumferentially positioned (e.g. FIG. 5) or can be around the perimeter of a QR code 306 (e.g. FIG. 8), among other configurations.

In further embodiments, the array of immobilized capture molecules 320 positioned at different regions of the detection zone 340 form different capture patterns 410 for different analytes 310. Thus, by increasing the complexity of the array and capture pattern 410, the anti-counterfeiting measures can also be increased.

In some embodiments the capture pattern 410 is revealed by migrating the labeled analyte 310 over the longitudinal extent of the detection zone 340. In some embodiments, the test device 300 includes a plurality of distinct channels, where each channel has a different sample mixing zone 330 for mixing a same or different detectable reagent 335, and where migration of corresponding labeled analytes 310 is parallel to one another, whether along the longitudinal extent of the test strip 380 or perpendicular to the longitudinal extent of the test strip 380. This approach provides a capture pattern 410 through migration over different pathways.

In other embodiments, the capture pattern 410 is revealed by migrating the labeled analyte 310 radially from a central application zone 390. In some embodiments, the test device 300 includes a plurality of distinct channels, where each channel has a different sample mixing zone 330 for mixing a same or different detectable reagent 335 during radial migration. In other embodiments, the sample mixing zone 330 is configured as a ring so that a radially migrating analyte 310 will encounter a sample mixing ring prior to the capture pattern 410. In other embodiments, the sample mixing zone 330 is a single puncturable pouch at about the center of a capture pattern 410.

In instances where the analyte 310 is a polypeptide, the capture reagent 320 can be an antibody or antibody fragment against the polypeptide. Antibodies and antibody fragments can be generated and immobilized using a variety of approaches well known in the art to which the invention belongs. Chemistries for immobilizing polypeptides to strips or sheets is known in the art to which the invention belongs.

In the case of an analyte 310 embodied as a nucleic acid, the capture reagent 320 can be a complementary nucleic acid strand. Immobilizing a complementary strand to the test strip 380 can be performed by inkjet printing a suspension of the complementary strand at the detection zone 340, then treating the test strip 380 until the suspension is well dried and adhered to the test strip 380. Alternatively, the capture reagent 320 can be chemically bound to the test strip 380 at the detection zone 340 using techniques known in the art to which the invention belongs.

When the analyte 312 is embodied as a nucleic acid, in some embodiments the test device 380 includes a heating element that heats the detection zone 340 to a temperature that is near the melting temperature of the analyte 310 and capture reagent 320 to ensure the captured analyte 320 is the proper complement to the immobilized strand. Such embodiments may be of interest when the collected sample also includes masking DNA that may be captured under low temperatures thereby reducing the availability of the capture reagent 320 for capturing the analyte 310. The heating element can be a resistor such that resisting current traveling through a simple circuit causes the resister to heat to the desired temperature.

Figure 12A:
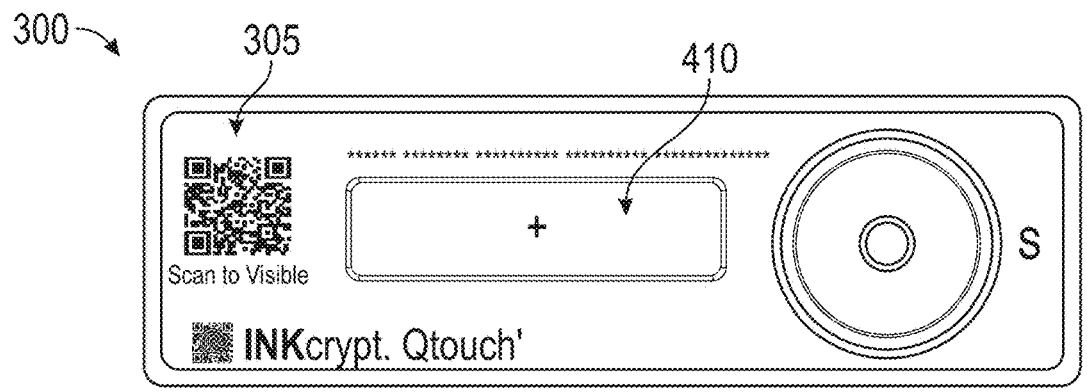
FIGS. 12A-D depict four different variations for the display of test results as capture patterns 410, namely, a positive/negative result FIG. 12A, a series of numbers FIG. 12B, a pattern of lines arranged in alignment FIG. 12C, and variable positioning of lines or blocks FIG. 12D.
Figure 12B:
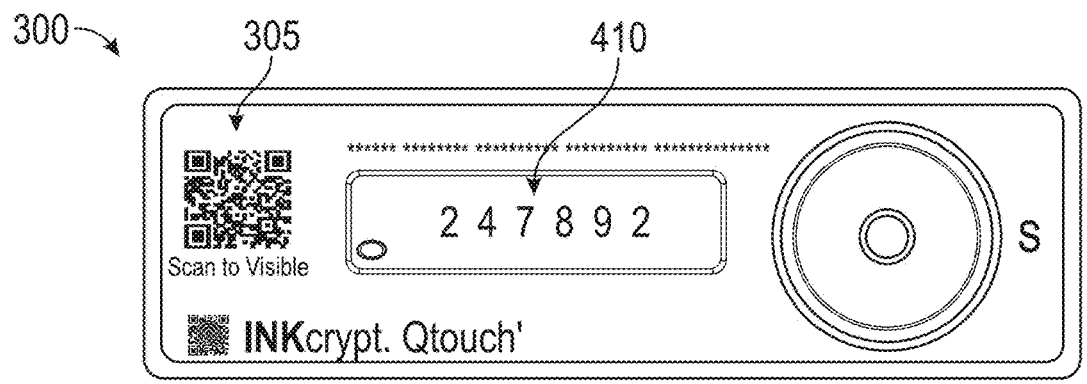
Figure 12C:
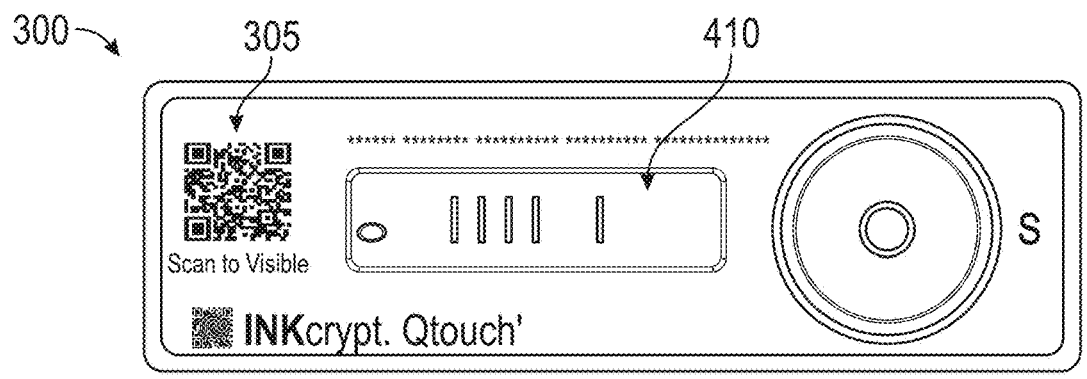
Figure 12D:
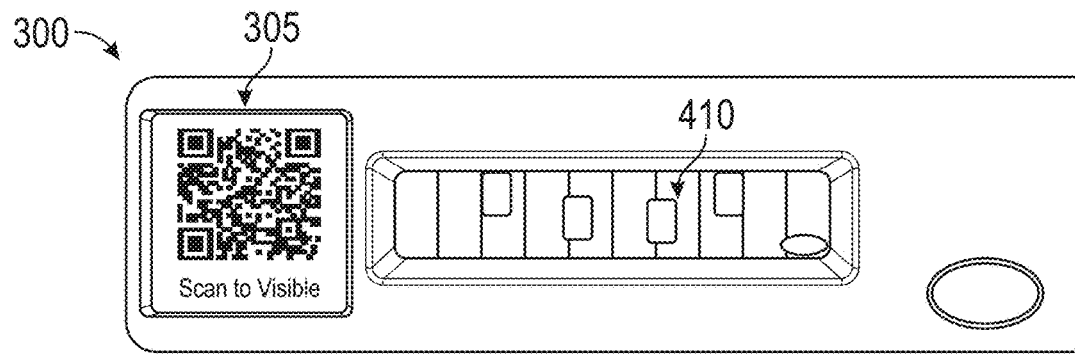

As shown in FIG. 12A, in some embodiments, a test device 300 can be exclusive to an analyte, where the capture pattern 410 provides only a yes/no indication (such as by yes=+ and no=−). A shown in FIG. 12B, a test device 300 can have a capture pattern 410 that reveals an alphanumeric display. In FIG. 12C, the capture pattern 410 is a series of lines in alignment. In FIG. 12D, the capture pattern 410 provides an array of varying positions in a multi-tiered approach. In each approach of FIGS. 12B-12D a test device 300 is encoded with a device code 305 and the array of immobilized reagents 320 is arranged differently across different device codes 305. This approach permits use of a same capture molecule 320 in different capture patterns 410 for added security. In such embodiments, the device code 305 is paired with a particular capture pattern 410. Thus, test devices 300 can vary in that they can be exclusive by provide a yes/no indication (FIG. 12A), they can reveal a separate activation code (FIG. 12B), and they can be multi-tiered (FIG. 12D) and include a tracer.

Figure 7:
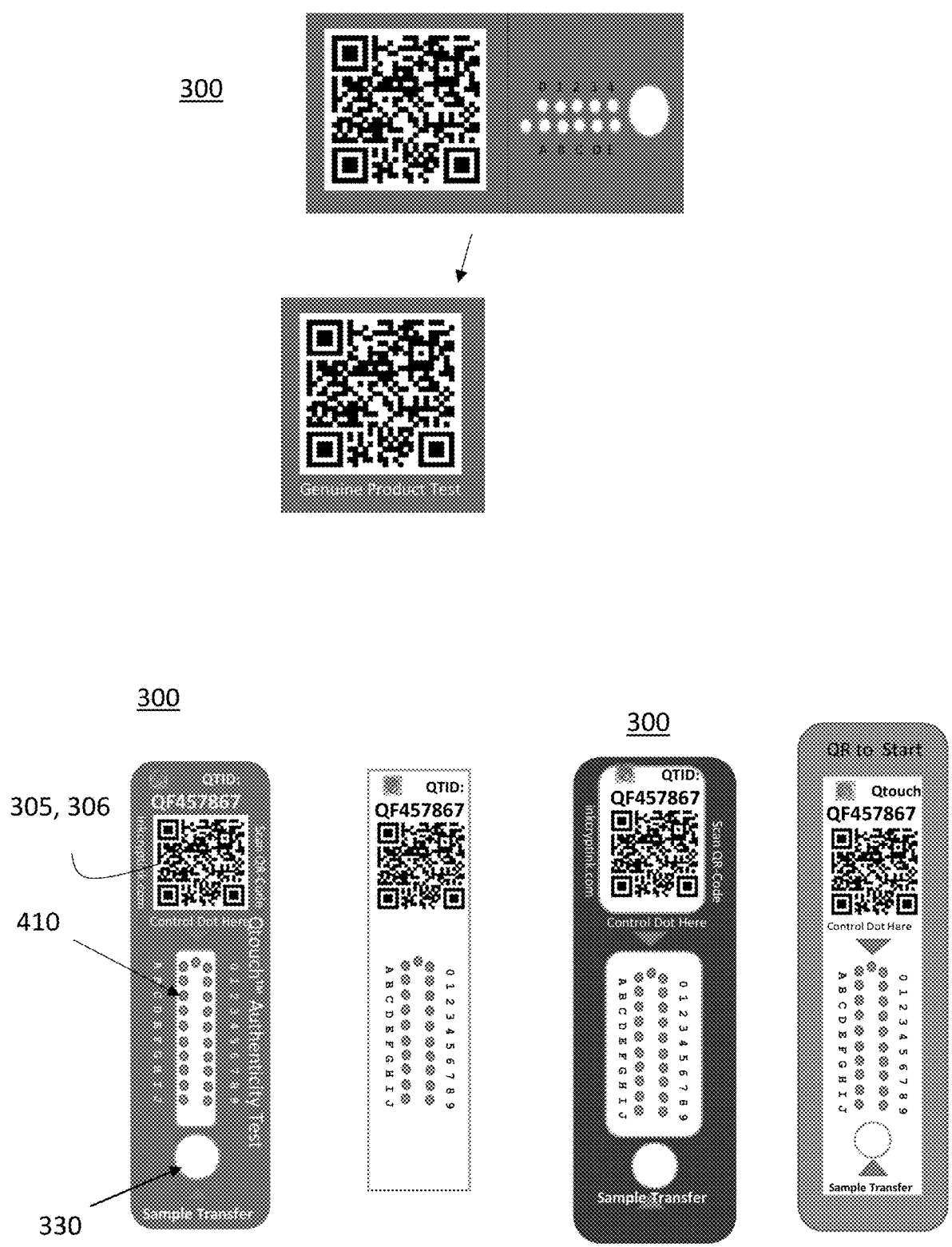
FIG. 7 shows the test device 300 can be folded over for storage or can have an adhesive backing or perimeter. The test device 300 can then be adhered to an article in need of authentication or a top layer to form the test device 300.
Figure 8:
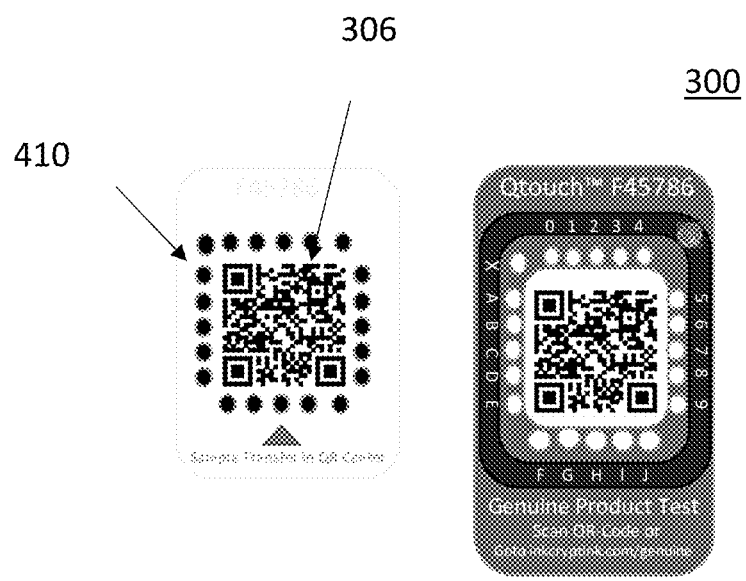
FIG. 8 depicts a test device 300 with a QR code 306 and a capture pattern 410 positioned around the perimeter of the QR code 306.
Figure 9:
FIG. 9 depicts a document with an integrated capture pattern 410 and QR code 306, where a sample is taken from the QR code 306.
Figure 9:
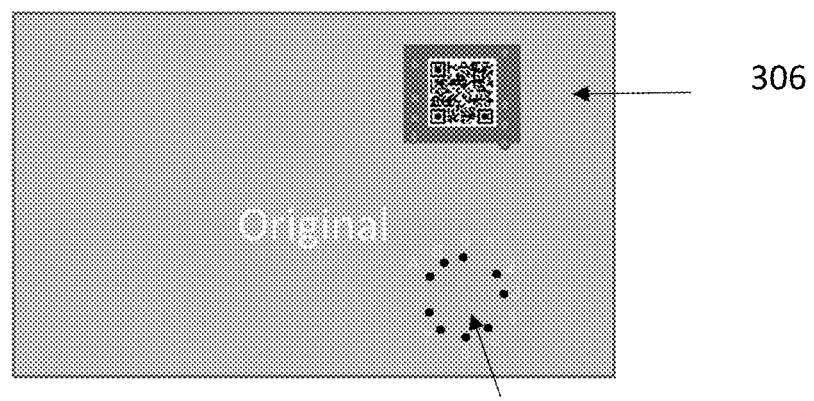

Further, as shown in FIGS. 5-6 and FIGS. 17-18, the capture pattern 410 can be arranged around the perimeter of the sample application zone 390. As shown in FIG. 7, the capture pattern 410 may reveal a combination of numbers and letters.

Figure 18:
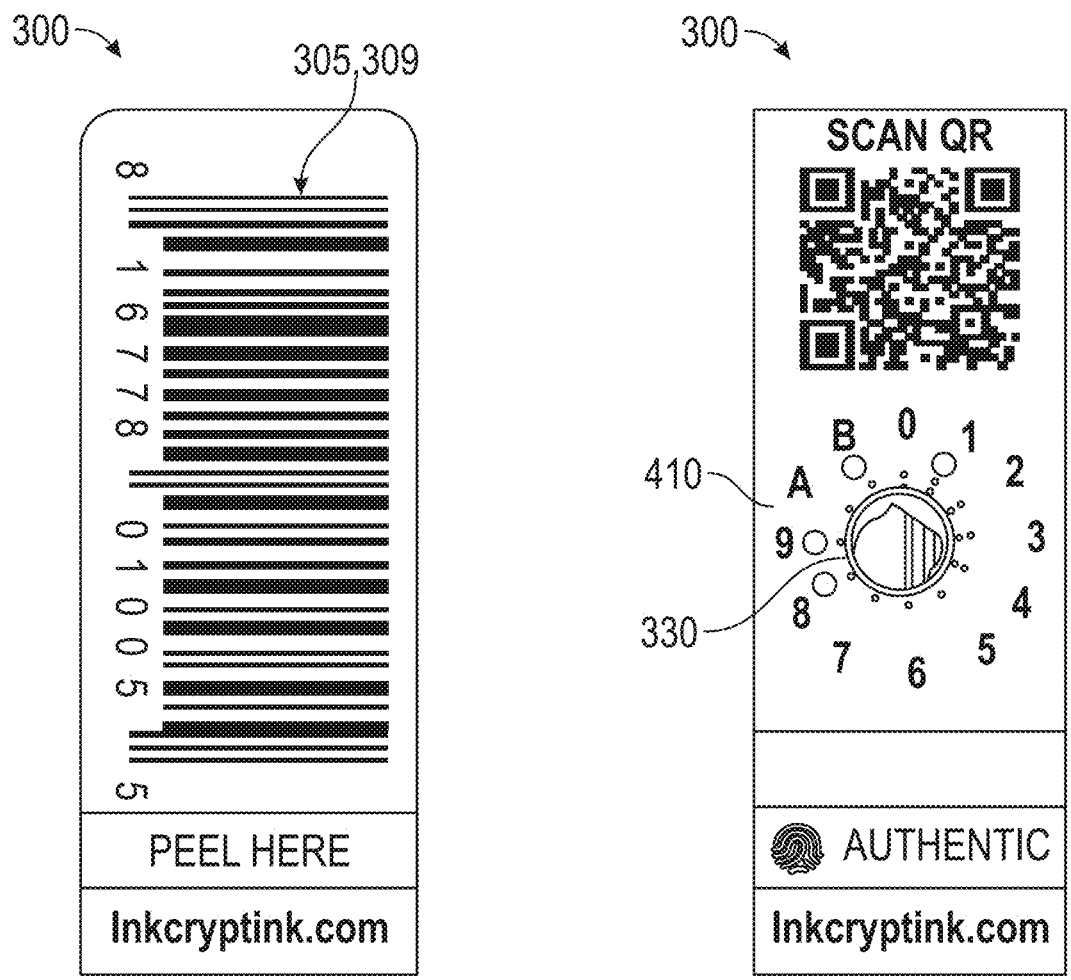
FIG. 18 is a photograph of a test device 300 where a test device code 305 is embodied as peel away UPC code for purchasing the test device 300 prior to authentication.

Accordingly, the test device 300 can also add to the anti-counterfeiting capabilities of the method and system by providing a test device code 305 that that associates the particular test device 300 with the capture pattern 410. Thus, the presence of a label 370 may require further authentication with the corresponding test device code 305 to confirm authentication. The test device code 305 can be a string of numbers under a tear away cover so that the test device code 305 is not revealed until testing. In other embodiments, the test code 305 is revealed by migration of the fluid itself, which develops a readable code on the test strip 380, such as by chemical reaction. In still other embodiments, the test device code 305 is written in a computer readable format, such as a matrix bar code, a quick respond code (QR code) 306 (FIG. 2), an augmented reality code (AR code), and a barcode 309 (FIG. 18). As shown in FIG. 18, in some embodiments, the test device code 305 is a peel away cover (such as a barcode 309) that temporarily covers a sample application zone 330 and optionally a region for displaying a capture pattern 410.

Figure 10:
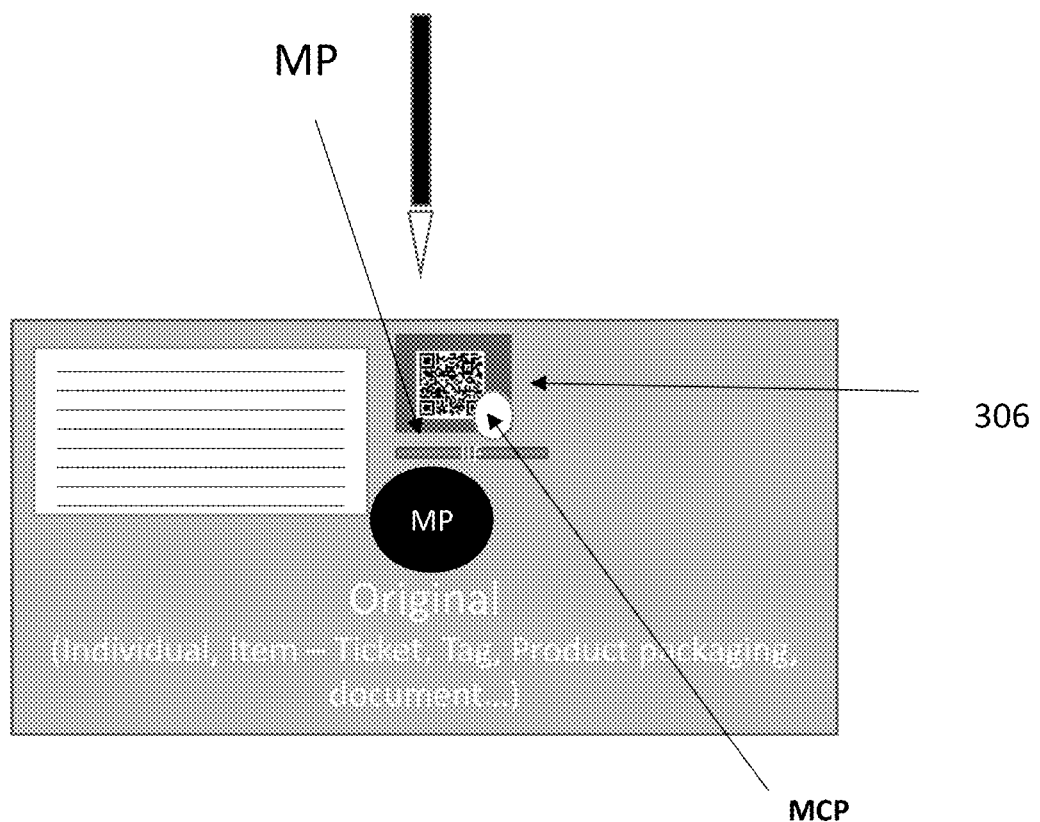
FIG. 10 shows a product with a micro fluid pouch MP, and a sample collection/application pad MCP associated with the QR code 306.
Figure 13:
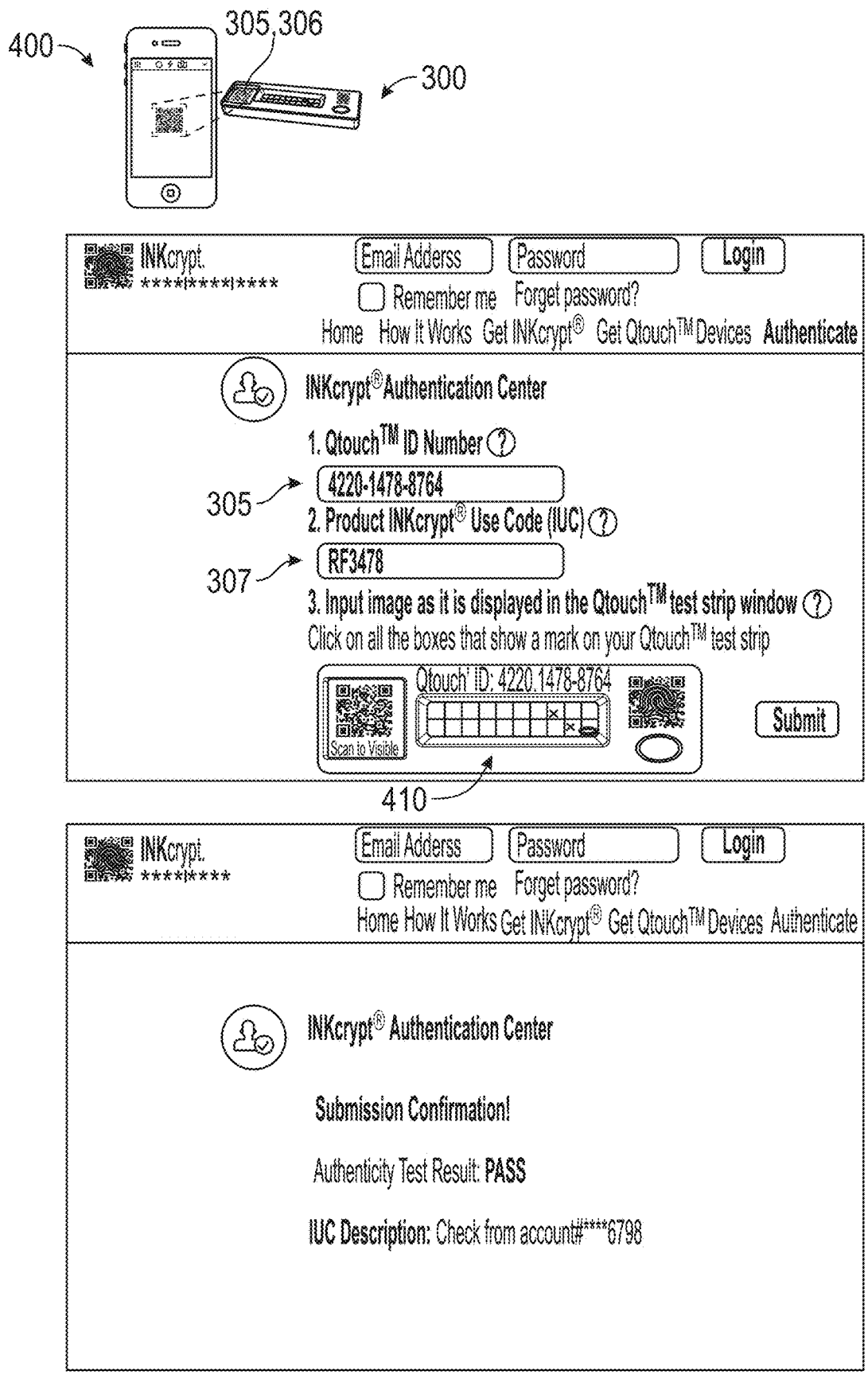
FIG. 13 depicts the reading of a QR encoded test device code 305 by a mobile phone 400, which launches a web browser to a web site, where test device code 305, use code 307, and capture pattern 410 is inserted for authentication, followed by a screen confirming authentication.

A QR code 306 is a matrix bar code that is a machine-readable optical label that contains information about the item to which it is attached. A QR code 306 uses four standardized encoding modes (numeric, alphanumeric, byte/binary, and kanji) to efficiently store data. Typically a QR code 306 has black squares arranged in a square grid on a white background, which can be read by an imaging device such as a camera, and processed using Reed-Solomon error correction until the image can be appropriately interpreted. Data is then extracted from the patterns that are present in both the horizontal and vertical components of the image. To this end, the test device code 305 can be encoded in a QR code 306 for pairing with a capture pattern 410. Furthermore, as shown in FIG. 13, the QR code 306 can be configured to direct a web browser to an Internet web page for authentication of test results. The QR code 306 or a portion thereof can be printed using the analyte composition 100 such that a sample is taken from the printed QR code 306 (or portion thereof) for testing (FIG. 10). In some embodiments the outer quadrants of the QR code 306 used for alignment are printed with the analyte composition.

An AR code provides added features to QR codes 306. In such embodiments, the QR code 306 can open a url to AR.js content. The imaging device then displays 3d content on top of it. AR is essentially all in javascript and can run on a variety of platforms. In some embodiments, the displayed content is an image of the capture pattern 410 for authentication. In other embodiments, the displayed content is an image of the substrate security feature 200 for authentication. The AR code or a portion thereof can be printed using the analyte composition 100 such that a sample is taken from the printed AR code (or portion thereof) for testing.

FIG. 18 depicts an embodiment where a bar code 309 in the form of a UPC code is used as the test device code 305. In FIG. 18, the UPC code is used to purchase a product or service. In such instances, the test device 300 can be purchased at a retailer by scanning the UPC code into a register or via the Internet to a third party payment service (e.g. paypal). Afterwards, the UPC code can be peeled away and the authentication test can be performed to reveal a capture pattern 410. This capture pattern 410 and UPC code pair may be used to provide variations of a same product, such as varying sizes, colors, quantities and others. The user can then access an online supplier (e.g. retailer, shipper or distributor) using a QR code, scan the UPC code and transmit the capture pattern 410 to identify a purchased product. The user then enters shipping information for delivery of the particular product or service. This approach can significantly reduce the need for on-site inventory and can easily integrate with third party payment services (e.g. paypal).

Anti-counterfeiting methods have been further improved by analyzing test results using an electronic device able to communicatively connect to an authentication authority 450. The authentication authority 450 is a computerized system that communicates with users and intermediaries to authenticate goods.

Authentication itself can be by way of comparing a plurality of data fields received by the test results to those stored in a database. Information stored in the database can include sets of analytes 310 assigned to particular analyte encoded composition 100, capture pattern 410 configurations and test device codes 305 incorporating combinations. By comparing both the acquired test results or capture pattern 410 and the test device codes 305 themselves to data stored in the database, the authentication authority 450 is able to reliably authenticate goods.

As shown more clearly in FIGS. 1 and 13, in preferred embodiments, authentication involves communication between the authentication authority 450 and an electronic device, such as a mobile phone 400, in which the electronic device reads a device code 305 (e.g. QR code 306), transmits a device code 305 to the authentication authority 450, and receives a data file providing authenticating test results for comparison. The test results are manually inputted into the electronic device corresponding to the capture pattern 410, or the test results are electronically inputted into the electronic device from capture pattern 410 imaging.

In a preferred approach, the test results are transferred to the authentication authority 450 for authentication, and the authentication authority 450 notifies the electronic device or mobile phone 400 of authenticity after comparison with an authentication database of authentic test results. In further embodiments the authentic test results are predetermined by a user during a setup process and/or includes the assignment of particular analytes 310 to an analyte composition 100 and particular patterning of capture molecules 320 for a collection pattern 410.

Test results are preferably transferred to the authentication authority 450 by way of the Internet 460. In some embodiments, the test results are manually inputted into the electronic device. In further embodiments, inputting the test results includes selecting positions within a graphical user interface corresponding to a viewed array pattern 410. That is, once connected to the authentication authority 450, the authentication authority 450 can query the characteristics of the capture pattern 410 viewable on the test device 300. In some embodiments, inputting the test results includes inputting a series of numbers and/or letters characterized as a series of fields within a capture pattern 410 indicating the presence of the analyte 310 (e.g. FIG. 7) In some embodiments, the pattern 410 is presented as option among a plurality of potential patterns 410 displayed by the authentication authority for choosing by the user. That is, the authentication authority 450 can present a series of selectable options for selection by the user.

In other embodiments, the test results are uploaded to the authentication authority 450 as an image file formed by the electronic device. In particular, imaging features can be used to upload an image or photograph of the array. The uploading of images is an approach well known in the art as are software applications that provide guidelines for aligning images. To this end, the authentication authority can provide electronic instructions for camera alignment by the electronic device.

In view of the above and with reference to FIGS. 1-18, a method of article authentication can include providing an authentication authority 450 communicatively coupled to a database; assigning a set of nucleic acid markers as analytes 310 to a printable analyte encoded composition 100 and storing nucleic acid marker identifiers in the database; providing a test device 300 that detects the presence of the analytes 310, wherein the test device 300 has a test device code stored in the database and a substrate having an array of immobilized capture molecules 320 to capture the analyte 310 in a capture pattern 410; printing the analyte encoded composition 100 onto a substrate 200 to form printed indicia; collecting a sample of the printed indicia; testing the sample for the presence of the analytes 310 using the test device 300 to acquire test results; and transferring the test results and test device code 305 to the authentication authority 450 for authentication and in return is notified of authenticity after comparison to an authentication database of authentic test results.

In such embodiments, communication with the authentication authority 450 is preferably through the Internet 460, where the authentication authority 450 is configured as a server with website access for data transfer.

In some embodiments test results are transmitted electronically to the authentication authority through a mobile phone 400 loaded with a suitable software application. In further embodiments the software application together with a camera built into the mobile device captures a complete or near complete image depicting the set of data for authentication, which includes an image depicting the capture pattern 410 or positioning of identifying marks representing the presence of analyte 310 and optionally the test device code 305 associated with the test device 300. Naturally, the test device code 305 could be provided separately by transmitting a QR code 306, which then launches the camera function. Such an approach merely requires the user to line up the test device 300 with the mobile phone 400 and take a picture. The software application then transmits the image. In some embodiments time/date/location of the image is also transmitted for further authentication.

By incorporating an authentication authority 450, still further security measures have been developed to protect against counterfeits. Among these include user specific identification keys and user specific analyte encoded security compositions 100. Further, a registration process has been developed where users are able to generate user exclusive analyte encoded security compositions 100 to secure products. As an example, a user-exclusive analyte encoded composition 100 can require setup of a member account with the authentication authority and registration of one or multiple exclusive ID's from a near unlimited inventory of unique codes—each of which is linked to a specific analyte 312 and/or capture pattern 410. Authorized members have the ability to generate unique use codes from a near unlimited inventory of codes associated with IDs, and submit a brief use profile associated with each use code. Acquisition of user exclusive analyte encoded compositions 100 requires unique acquisition codes which must be requested by the system-verified member from the authentication authority, one for each line item of a prospective ink acquisition available through analyte encoded security fluid certified suppliers. The subscriber forwards the acquisition code to the supplier who ships the ink (optionally capture pattern 410) and acquisition code to the authentication authority 450 for verification of authorization, database update and final delivery to a user authorized location. The members are entitled to acquire exclusive test devices 300 which are unique-number encoded and associated with specific use codes. The test devices 300 can be used by examiners, enforcement and the users of end products for testing and reporting of results using the a smartphone software application or directly at the online portal of the authentication authority 450.

Alternatively to the user exclusive analyte encoded security fluid identification method, the user may opt to enable public authentication of the composition 100. Rather than enabling only select parties with authentication keys for a users' specific analytes 310 the public authentication option is based on a predefined limited inventory of analytes 310 which can be identified using public test devices with built-in ability to authenticate all public analytes 310. To prevent predictability of public device test results each test device 300 is uniquely numbered with a test device code 305 and differentiated by a random-patterned a grid configuration of dots and dashes of varying length and diameter from captured analytes in the detection zone. Each random pattern is database recorded and associated with the test device code(s).

As further security features, the authentication authority 450 is programed with a random generator to randomize the grouping of available analytes 310 (e.g. nucleic acid markers) for a particular analyte encoded security composition and can randomize the positioning of capture agents 320 along capture array within the detection zone 340 of the test device 300.

In some embodiments, the authentication authority 450 also maintains tracking information to track the progress of a good through commerce. This can be by way of saving test results and test device codes throughout the transfer of goods.

Figure 14:
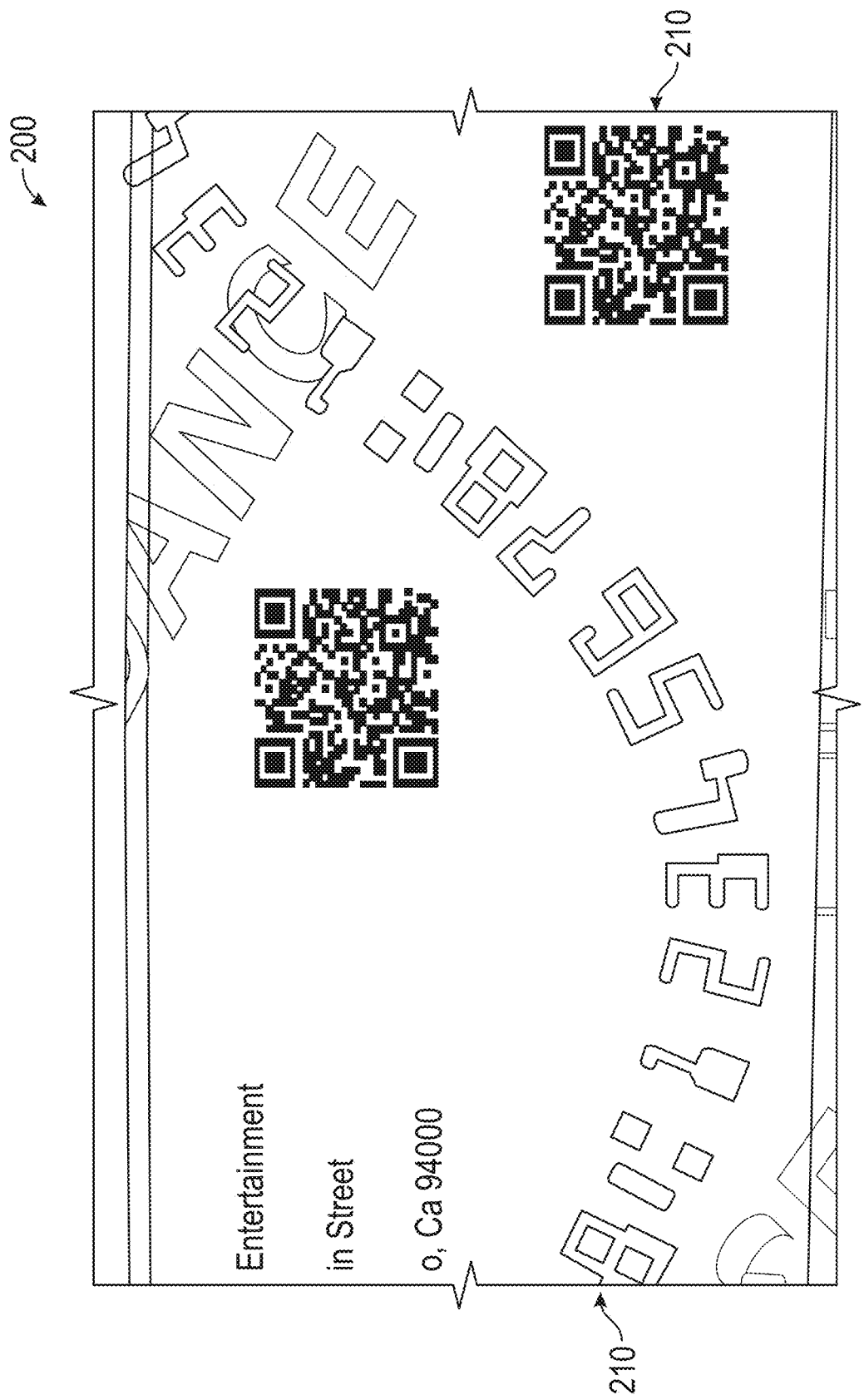
FIG. 14 depicts a substrate security features 210 revealed by exposure to ultraviolet light on a substrate 200.
Figure 15:
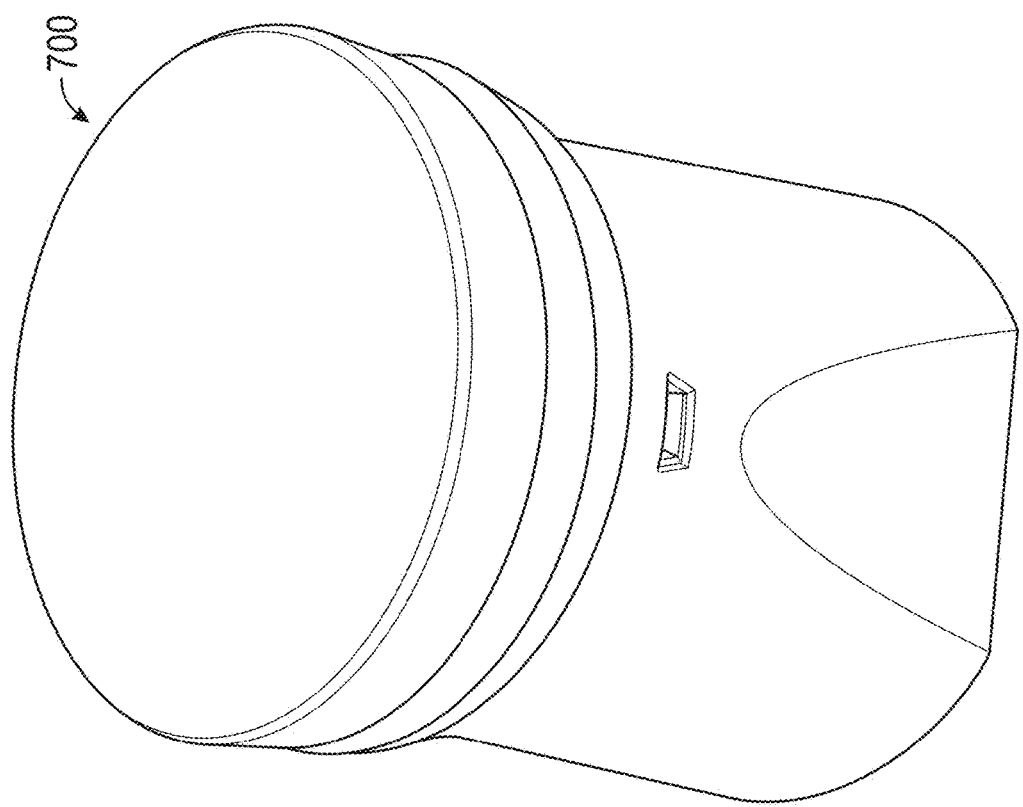
FIG. 15 is a photograph of a spectrophotometric analyzer 700 in communication with a mobile phone 400.
Figure 15:
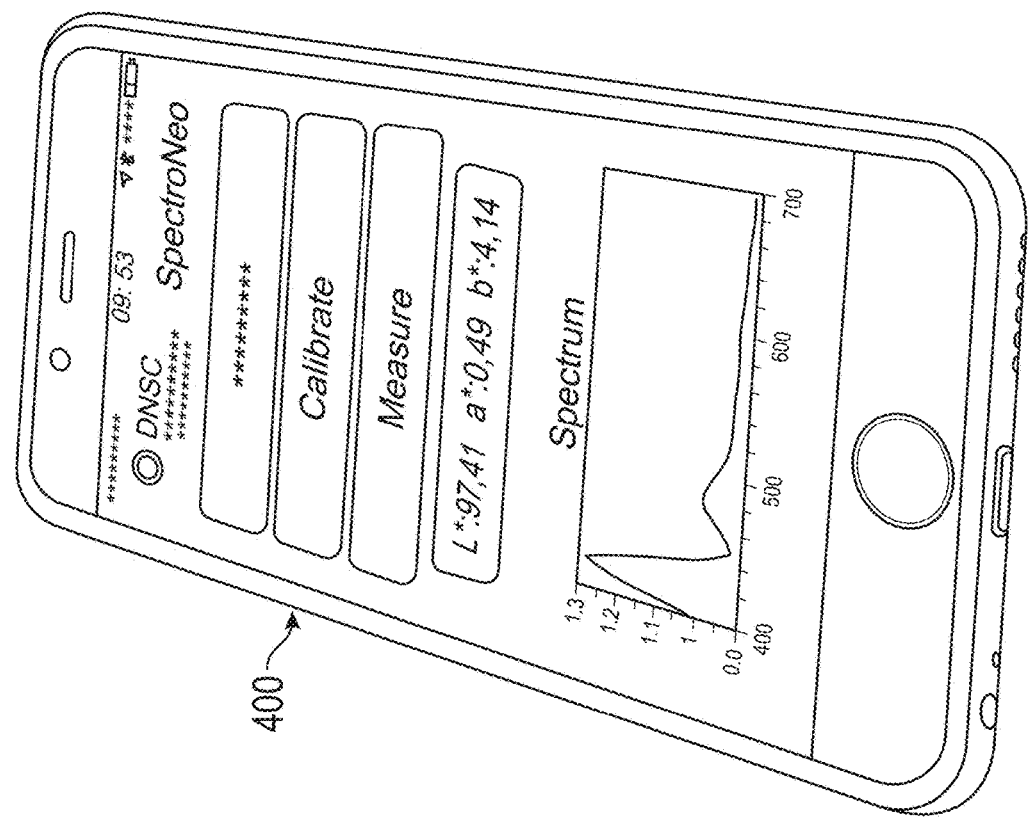
Figure 16:
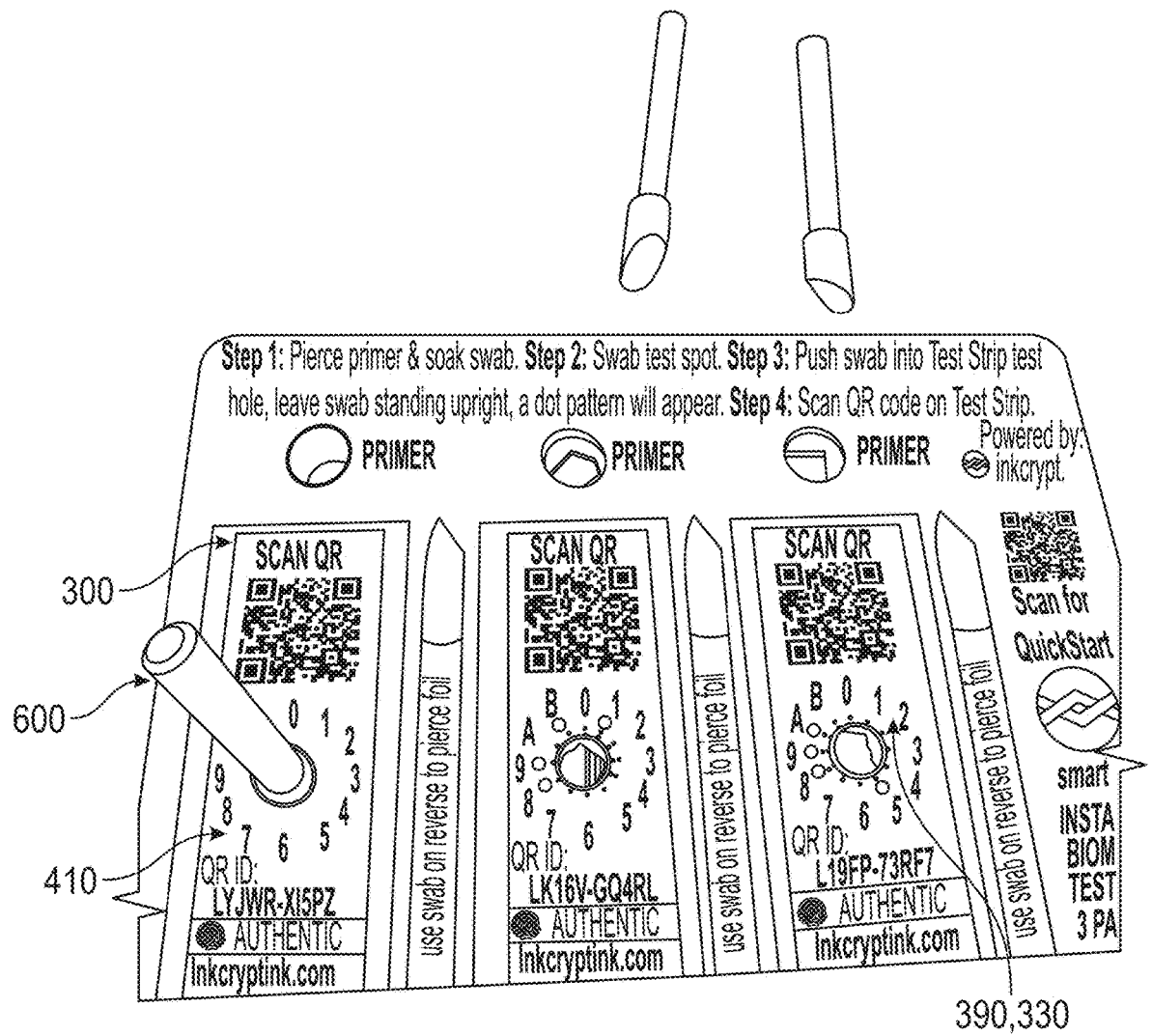
FIGS. 16 and 17 are photographs of various embodiments of the test device 300 having a circular capture pattern 410 positioned around a central access port for a wand 600.
Figure 17:
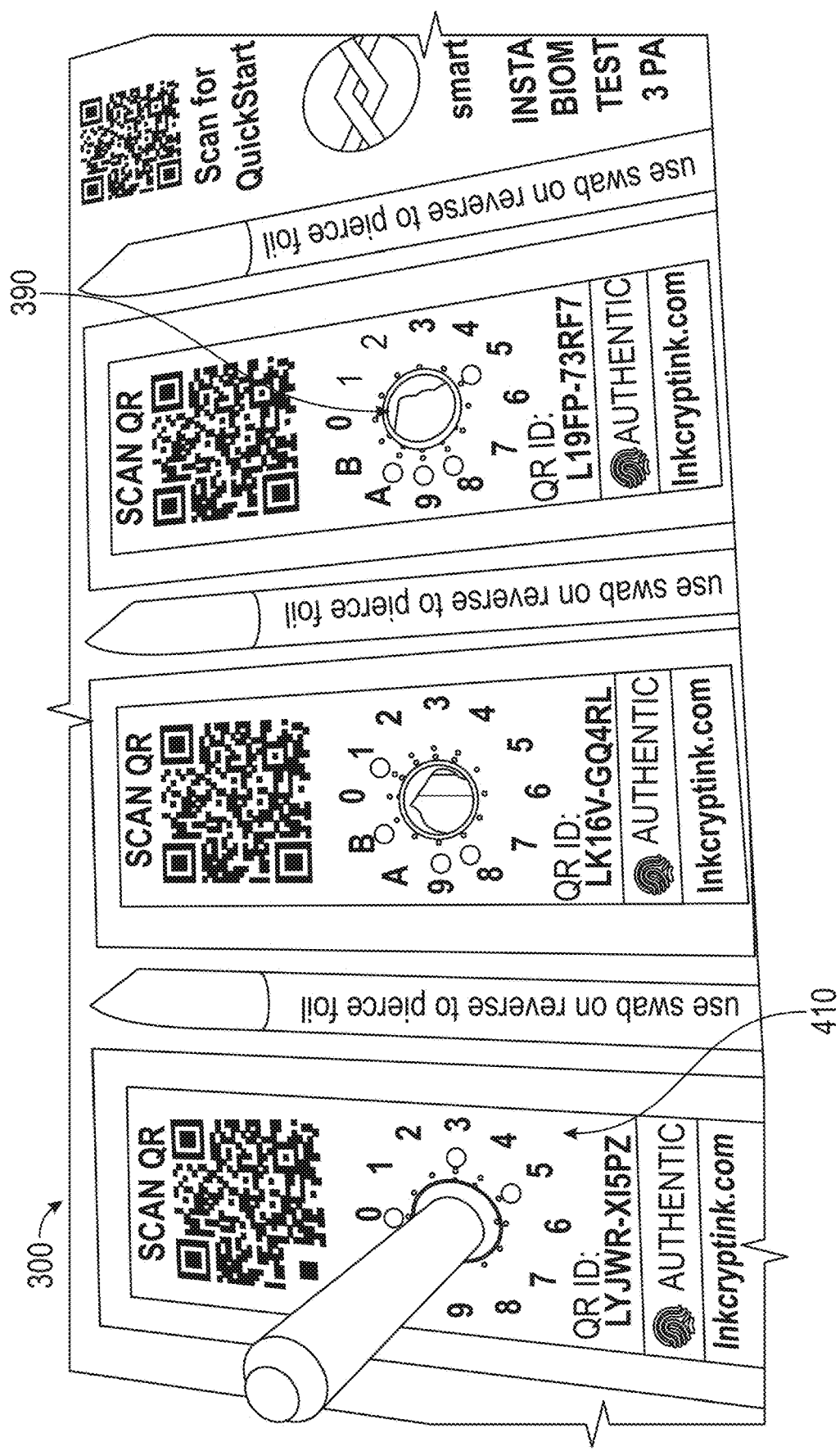

In embodiments where a substrate security feature 210 is provided, the electronic device (or mobile phone 400) can also be communicatively coupled to a spectrophotometric analyzer 700 that emits ultra-violet and/or near infra-red wavelengths and detects the presence of a substrate security feature 210 when present (as shown more clearly in FIGS. 14 and 15). An exemplary method of authentication includes providing an authentication authority 450 communicatively coupled to a database, wherein a substrate security feature 210 is stored in memory; printing the substrate security feature 210 onto a substrate 200 using a security fluid 100 to form security indicia, wherein the security indicia displays the security feature 210 when exposed to ultra-violet or near infra-red wavelengths; testing the substrate 200 for the presence of the substrate security feature 210 using a test system, which includes a spectrophotometric analyzer 700 that emits ultra-violet and/or near infra-red wavelengths and detects the presence of the security feature 210 when present, and a mobile device 400 communicatively coupled to the spectrophotometric analyzer 700, wherein the mobile device 400 is loaded with a software application to query the authentication authority as to the authenticity of the security feature 210 or security indicia; and thus the method further including querying the authentication authority 450 to authenticate the tested substrate.

Authentication of substrate security features 210 can be performed using the mobile device 400 to communicate or compare the detected security features 210 with data files previously saved and accessible by the authentication authority 450. The security feature 210 can be arranged in multiple information layers. The security feature 210 may be aligned linearly, or aligned in non-linear, randomly real-time computed security patterns. The security features can be alphanumeric strings or images. In some embodiments, the authentication authority 450 receives a query including the detected substrate security feature 210 from the mobile device 400, compares it to a file stored in memory, and confirms or denies the authentication query in a response. In another embodiments, the authentication authority 450 receives a query including a partially detected security feature 210 from the mobile device 400, retrieves the full or additional security feature 210 stored in memory, and transfers the full or additional security feature 210 to the mobile device 400. The mobile device 400 or user can then confirm or deny the authenticity of the good by comparing the remaining security features 210 with the transferred file.

To this end, in some embodiments the substrate 200 is encoded with a substrate security feature 210 separate from the analyte encoded composition 100. This permits further security by providing an additional layer of authentication.

A substrate security feature 210 has been developed for use in the methods and systems, which includes printed indicia that is printed with a downshifting print media that is outside of the visible spectrum until activated. Activation under UV light is shown in FIG. 14. In particular formulations have been developed for printing indicia using fluorescent colorants that require excitation.

The substrate security feature 210 has been further developed to provide stereoscopic images that are hidden under conventional lighting but viewable when exposed to ultra-violet light. This is accomplished, at least in part, using downshifting print media formulations that include molecules, which in response to applying one or more energy sources in the range of about 200-400 nm to the printed substrate 200, generate images in the visible spectrum that can be viewed. The downshifting print media formulations are preferably grouped together to form a suite of inkjet inks configured to interact with the energy source to produce different visible spectra.

The downshifting print media formulations have also been combined with conventional colorants to view one color under ordinary light conditions and a second color under ultraviolet exposure. To this end, the suite can be used for printing security features on documents to assist with authentication.

In general, inkjet inks are either dye or pigment-based. Dye-based inkjet inks generally use a soluble colorant that is usually water-based. Conversely, pigmented inks typically use an insoluble or dispersed colorant to achieve color.

The downshifting print media formulations preferably incorporate fluorescent molecules or dyes or infrared-excitable molecules or dyes. Fluorescence is the emission of radiation, such as visible light, by a substance during exposure to external radiation, such as ultraviolet light. When a fluorescent molecule (as shown in or dye is struck by ultraviolet light, which is invisible to the human eye, it emits a light in the visible spectrum, thereby becoming visible. Once the ultraviolet light source is removed, so does the emission, thereby rendering the molecule or dye invisible to the human eye. The downshifting print media formulations operate using this principle. That is, exposing a substrate 200 to an ultraviolet light (such as by using a spectrophotometric analyzer 700 shown in FIG. 15) will reveal substrate security features 210 printed with the downshifting print media formulations (as shown in FIG. 14) and removal of the ultraviolet light will hide the substrate security features 210. Likewise, when an infrared-excitable molecule or dye is struck by infrared radiation, which is invisible to the human eye, it emits a detectable signal, thereby confirming its presence. Once the infrared light source is removed, so does the emission, thereby rendering the molecule or dye invisible. That is, exposing a substrate to infrared radiation will reveal substrate security features printed with the downshifting print media formulations and removal of the infrared radiation will hide the security features 210.

There are a number challenges in forming downshifting print media formulations that are selectively viewable under ultraviolet light. For example, inkjet formulations must be provided at a viscosity and surface tension that permit dispensing from an inkjet printer. This is a further challenge when the object is to print downshifting print media formulations at a resolution of at least 600 dpi and still a greater challenged when a print resolution of 1200 dpi is desired. Such high-speed resolution permits the interlacing complex images to achieve high-resolution stereoscopic imaging. High resolution is desired when generating anti-counterfeiting technologies, such as those described herein.

The primary solvent for suspending the fluorescent molecule or dye in the downshifting print media formulations may vary depending on the properties of the molecule or dye and depending on the substrate 200 upon which it is printed. Accordingly, the term "solvent" within the context of the invention refers to aqueous or non-aqueous and organic or inorganic solvents known in the inkjet arts. Examples of solvents that may be used with the invention include water, isopropanol, tetrahydrofuran (THF), acetone, hexane, petroleum, epoxy and others. The solvent may be chosen in part depending on the desired substrate 200 such that the downshifting print media formulations will effectively print on the substrate.

When adapting a fluorescent molecule or dye for inkjet printing, it is important to provide the formulation at an appropriate viscosity. A viscosity that is too high tends to clog the jets or tends to bead on the surface causing an uneven printing. A viscosity that is too low tends to be "runny" when dispensed and reduces the control over the high resolution positioning of images for interlacing. Accordingly, when using drop-on-demand type printers such as bubble jet printers and piezoelectric printers, the preferred viscosity is less than about 15 centipoise (cp). More preferably the viscosity is about 2-8 cp. The viscosity can be adjusted by adding thickeners or dispersants.

In addition, a variety of additives may be provided, including but not limited to one or more biocides, humectants or drying control additives, synergists, substrate conditioners or wetting additives, surface appearance additives, polymer additives, anti-settling additives, dispersants, foam control, adhesion promotion additives, rheology control additives and others as known in the inkjet arts.

Biocides and fungicides are chemical substances or compounds capable of killing living organisms. As such, their inclusion may prevent growth or attachment of living organisms to the formulation thereby increasing its lifespan. Biocides and fungicides may be synthetic or natural and may themselves have short or long half-lives. A variety of biocides and fungicides are known in the inkjet arts and thus their inclusion and relative amounts may be determined by the ordinarily skilled artisan in view of the guidance herein.

Humectants are compounds that reduce evaporation and are often provided as a co-solvent together with a dispersant. Accordingly, humectants assist in retaining a consistent concentration of fluorescent molecules or dyes throughout the shelf life of the formulation. An exemplary humectant is ethylene glycol. Examples of preferred co-solvents include ethylene glycol, polyethylene glycol (PEG), glycerine, hydroxyl-(poly) ether, hydroxyl-(poly) ketone, a hydroxyl-(poly) aldehyde and the like. As a nonlimiting example, humectants are usually provided between 0% and less than 1%; however, greater amounts such as about 5%, 10%, 15% and 20% are also encompassed by the invention.

An exemplary downshifting print media formulation is shown in TABLE 3 below:

TABLE 3

DOWNSHIFTING PRINT MEDIA FORMULATION

| Component | Composition | Purpose |
| --- | --- | --- |
| Water | 50-90% | Solvent, carrier fluid |
| Florescent Molecule or Dye | 0-10% | Wavelength Shifting |
| Co-solvents | 5-50% | Humectants, enhance ink formation on paper |
| Surfactants | 0-5% | Improve wetting and flow through nozzle |
| Polymeric binders | 0-10% | Increase durability and appearance of print |
| Other additives: biocides | 0-1% | Prevent bacteria growth |

The downshifting print media formulation is preferably printed on a substrate that does not react with an ultraviolet light thereby preventing or reducing interference with the output generated when exposing the printed formulation to ultraviolet light for detection.

When printing stereoscopic images, two or more different downshifting print media formulations are printed on a same substrate in the form of an image pair, which upon exposure to one or more suitable energy sources, provides an output of two visibly distinct wavelength ranges or colors from the pair. In some embodiments, a first downshifting inkjet formulation, upon exposure to light at a wavelength of 200-400 nm, emits light at a range of 550 to 750 nm, and a second downshifting inkjet formulation emits light at a range of 400-500 nm.

By combining a plurality of downshifting print media formulations, a colorant suite of daylight hidden inkjet formulations is provided suitable for correlated one-pass deposition to form a pair of complementing stereoscopic images using a dot-on-demand inkjet process, where each of the image pair members is selectively assembled from dot patterns of discretely energy shift differentiated colorants of the colorant suite.

In furtherance of the above, the image pairs can be formed of dot patterns from high resolution printing of different downshifting print media formulations. Thus in some embodiments a suite of daylight invisible inkjet formulations having at least two downshifting print media formulations suitable for correlated one-pass deposition of a pair of complementing stereoscopic images using a dot-on-demand inkjet process is provided where each of the image pair members is selectively assembled from dot patterns of discretely printed downshifting inkjet formulations.

Similarly, a suite of daylight invisible inkjet formulations having of at least 2 downshifting print media formulations suitable for correlated one-pass deposition of a pair of complementing stereoscopic images using a dot-on-demand inkjet process where each of the image pair members is selectively assembled from dot patterns printed with a downshifting inkjet formulation is provided. Exemplary formulations are provided in TABLE 4 and TABLE 5.

TABLE 4

DOWNSHIFTING INKJET FORMULATION

| Component | Composition |
| --- | --- |
| Fluorescent dye 1 | 5% |
| Surfactant | 2% |
| Solvent (aq) | 93% |

TABLE 5

DOWN SHIFTING INKJET FORMULATION

| Component | Composition |
| --- | --- |
| Fluorescent dye 2 | 5% |
| Surfactant | 2% |
| Solvent (aq) | 93% |

As such, the formulations have been adapted to provide new systems and methods of creating visible 3D stereoscopic output using dot on demand inkjet printing devices by precisely placing interlaced daylight invisible stereoscopic image pairs by means of invisible dye and pigment dispersions on UV non-interacting (indifferent) substrates and subsequent exposure to photons with energy levels beyond he/lambda, where lambda is 400 nm or less.

By providing a suite of downshifting print media formulations, and a print mode that interlaces images, the invention provides a method of generating three-dimensional stereoscopic images that are selectively viewed when exposing the printed substrate to ultraviolet light. The printing mode itself is based on binocular disparity, which is the difference in image location of an object seen by the left and right eyes. That is, when viewing an object, the left and right eyes see a slightly different image and when combined the brain perceives the sense of depth. In traditional printing, information is displayed left-and-right and also up-and-down. The in-and-out information is lost. In order to perceive in-and-out for a three-dmensional effect, the same object must be presented with a slight binocular disparity.

To this end, methods of printing a substrate security feature 210 that generates binocular disparity under ultraviolet light has been develop and is provided. In one approach, two copies of a same image are printed offset from another, each with a different downshifting print media formulation. In a preferred embodiment, the images are printed within only a few millimeters of each other.

Preferably, the images are printed using a single pass. In such instances, an image can be provided and duplicated. After which, each is assigned to a downshifting print media formulation. The images are then aligned offset to one another and printed using the suite of colorants having at least 2 downshifting print media formulations, where a first formulation is used primarily for the first image and a second formulation is used primarily for the second image.

By adjusting the fluorescent dyes, an improved 3D effect has been achieved. However, a still greater 3D effect has been achieved by providing two lenses for viewing the stereoscopic image, wherein each lens is aligned for viewing through a different eye, further wherein a first lens filters out a portion of the visible spectrum emitted by the first formulation and a second lens filters out a portion of the visible spectrum emitted by the second formulation.

The invention described herein may be embodied in other specific forms without departing from the spirit or essential characteristics thereof. The specific embodiments previously described are therefor to be considered as illustrative of, and not limiting, the scope of the invention.

What is claimed is:

1. A method for article authentication, the method comprising:
   a) providing an article having a substrate with an analyte encoded composition;
   b) obtaining a sample of the analyte encoded composition;
   c) applying the sample to a test device to obtain test results, the test device comprising,
      i) a substrate comprising an array of immobilized capture molecules to capture the analyte in a graphical pattern, and
      ii) a test device code associating the test device with the graphical pattern; and
   the test results comprising the graphical pattern;
   d) analyzing test results from the test device using an electronic device communicatively connected to an authentication authority, wherein the electronic device transmits the test device code and the test results to the authentication authority and the authentication authority confirms or denies authentication after comparison to an authentication database of authentic test results, wherein transmitting the test results comprises selecting positions displayed on a graphical user interface (GUI) of the electronic device corresponding to the graphical pattern.

2. The method of claim 1, wherein the analyte is selected from the group consisting of a nucleic acid sequence, a single stranded oligonucleotide, a polypeptide, and an organic molecule.

3. The method of claim 1, wherein the step of obtaining the sample comprises swiping the analyte encoded composition with a solvent loaded collecting wand to collect the analyte.

4. The method of claim 3, wherein the collecting wand comprises:
   a) an absorbent tip loaded with the solvent;
   b) a housing comprising a chamber with fenestrations configured for delivering wash fluid from the chamber to the tip, and a pump, optionally embodied as a plunger, that pumps the wash fluid through the fenestrations; and optionally,
   c) a removable cap configured to seal the fenestrations when closed and open the fenestrations when removed.

5. The method of claim 1, wherein the array of immobilized capture molecules is configured to capture at least two different analytes to reveal different capture patterns.

6. The method of claim 1, wherein the array of immobilized capture molecules is positioned circumferentially around a sample application zone.

7. The method of claim 1, wherein the test device code is written in a computer readable format, optionally selected from the group consisting of a quick respond code (QR code) and a barcode, optionally wherein the computer readable format is written in part with the analyte encoded composition.

8. The method of claim 1, wherein the graphical user interface (GUI) displays the test device with selectable fields for entering the viewed capture pattern.

9. The method of claim 1, wherein the capture pattern is inputted by inputting a series of numbers or letters displayed by the capture pattern.

10. The method of claim 1, wherein the electronic device comprises or is communicatively coupled to a spectrophotometric analyzer that emits ultra-violet and/or near infra-red wavelengths to detect the capture pattern.

11. The method of claim 1, wherein notification of authenticity is by way of text message or electronic mail.

12. The method of claim 1, wherein authentic test results display a chain of possession, optionally from manufacturer to retailer or to end purchaser.

13. The method of claim 1, wherein the test device comprises a fluid pouch configured for puncturing by a collecting wand.

14. The method of claim 1, wherein the test device comprises a removable cover, which optionally covers one or more of a sample application zone, a mixing zone, and a detection zone.

15. The method of claim 14, wherein the removable cover is a peel-away code, optionally for purchasing the test device and optionally as the device test code.

16. The method of 15, wherein the test device is purchased prior to removing the cover and the code is the test device code transmitted with the capture pattern for authentication.

* * * * *

```
                              SEQUENCE LISTING

<160> NUMBER OF SEQ ID NOS: 4

<210> SEQ ID NO 1
    <211> LENGTH: 30
    <212> TYPE: DNA
    <213> ORGANISM: artificial sequence
    <220> FEATURE:
    <223> OTHER INFORMATION: synthetic construct

<400> SEQUENCE: 1
ggccggtaag ctgcagaaga cattgacagt                                      30

<210> SEQ ID NO 2
    <211> LENGTH: 30
    <212> TYPE: DNA
    <213> ORGANISM: artificial sequence
    <220> FEATURE:
    <223> OTHER INFORMATION: synthetic construct

<400> SEQUENCE: 2
actgtcaatg tcttctgcag cttaccggcc                                      30

<210> SEQ ID NO 3
    <211> LENGTH: 25
    <212> TYPE: DNA
    <213> ORGANISM: artificial sequence
    <220> FEATURE:
    <223> OTHER INFORMATION: synthetic construct

<400> SEQUENCE: 3
tacaagattc acaacttggt atact                                           25

<210> SEQ ID NO 4
    <211> LENGTH: 25
    <212> TYPE: DNA
    <213> ORGANISM: artificial sequence
    <220> FEATURE:
    <223> OTHER INFORMATION: synthetic construct

<400> SEQUENCE: 4
agtataccaa gttgtgaatc ttgta                                           25
```